United States Patent
Ikeda

(10) Patent No.: US 7,554,979 B2
(45) Date of Patent: Jun. 30, 2009

(54) COMMUNICATION APPARATUS AND METHOD HAVING FUNCTION OF TRANSMITTING NOTIFICATION SIGNAL WHILE HIDING GROUP IDENTIFICATION INFORMATION

(75) Inventor: Nobuhiro Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 504 days.

(21) Appl. No.: 11/343,389

(22) Filed: Jan. 31, 2006

(65) Prior Publication Data
US 2006/0171388 A1 Aug. 3, 2006

(30) Foreign Application Priority Data

| Feb. 3, 2005 | (JP) | ............................... 2005-027224 |
| Feb. 18, 2005 | (JP) | ............................... 2005-043142 |
| Nov. 28, 2005 | (JP) | ............................... 2005-342224 |

(51) Int. Cl.
*H04L 12/28* (2006.01)
*H04W 4/00* (2006.01)

(52) U.S. Cl. ...................................... 370/389; 370/338

(58) Field of Classification Search ................. 370/295, 370/232, 254; 713/155
See application file for complete search history.

(56) References Cited

U.S. PATENT DOCUMENTS

2002/0176366 A1 * 11/2002 Ayyagari et al. ............ 370/245
2004/0131187 A1 * 7/2004 Takao et al. ................. 380/255

FOREIGN PATENT DOCUMENTS

| JP | 2002-176366 A | 6/2002 |
| JP | 2002-197956 A | 7/2002 |

* cited by examiner

*Primary Examiner*—Melody Mehrpour
(74) *Attorney, Agent, or Firm*—Canon U.S.A., Inc. I.P. Division

(57) ABSTRACT

A communication apparatus is configured to receive a search message from an additional communication apparatus while transmitting beacon information while hiding a group identifier. Then, the communication apparatus is configured to determine whether the additional communication apparatus is already registered. Alternatively, the communication apparatus determines whether predetermined information is included in a search signal from the additional communication apparatus. According to the determination, the communication apparatus transmits a response signal including group identification information to the additional communication apparatus.

15 Claims, 28 Drawing Sheets

FIG.10

| MAC ADDRESS *1001* | CONNECTION CHECK *1002* |
|---|---|
| 00:XX:XX:1E:ZZ:AA | ☐OK    ☐NG |
| 00:XX:XX:1E:ZZ:BB | ☐OK    ☐NG |
| 00:XX:XX:1E:ZZ:CC | ☐OK    ☐NG |
| 00:XX:XX:1E:ZZ:DD | ☐OK    ☐NG |
| 00:XX:XX:1E:ZZ:EE | ☐OK    ☐NG |
| 00:XX:XX:1E:ZZ:FF | ☐OK    ☐NG |

| MAC ADDRESS OF ACCESS TERMINAL 2801 | THE NUMBER OF TIMES 2802 | CONNECTION CHECK 2803 |
|---|---|---|
| 00:XX:XX:1E:FF:AA | 4 | ■OK  □NG |
| 00:XX:XX:1E:FF:BB | 2 | ■OK  □NG |
| 00:XX:XX:1E:FF:CC | 16 | □OK  ■NG |
| 00:XX:XX:1E:FF:DD | 16 | □OK  ■NG |
| 00:XX:XX:1E:FF:EE | 1 | ■OK  □NG |
| 00:XX:XX:1E:FF:FF | 1 | ■OK  □NG |

COMMUNICATION APPARATUS AND METHOD HAVING FUNCTION OF TRANSMITTING NOTIFICATION SIGNAL WHILE HIDING GROUP IDENTIFICATION INFORMATION

BACKGROUND OF THE INVENTION

1. Field of the Invention

The present invention relates to a communication apparatus and method having the function of transmitting a notification signal while hiding group identification information.

2. Description of the Related Art

A conventional IEEE 802.11b/a/g-based wireless LAN system needs to set the same service set identifier (SSID) in an access point (AP) and a wireless terminal. This setting needs to take account of differences in topology among an ad-hoc mode, an infrastructure mode, and so on. Thus, this setting is suitable for users accustomed to personal computers (PCs) to some extent but is unsuitable for beginners. However, recently, there has been provided a system configured so that a wireless-terminal-side application automatically detects group identifiers (SSIDs) of a plurality of groups and creates a list of connectable access points. As a result, the user is permitted to select an access point, to which an associated wireless terminal is connected, from the list.

Supporting such a wireless LAN system enables automatic establishment of connection to a network, without requiring complicated operations by the user, except for ensuring security utilizing encryption. This development has promoted the growth of a home use market by such a wireless LAN system in recent years.

Also, it is conceivable that a wireless terminal (a malicious third party), which is irrelevant to a user, may attempt an unnecessary access to a group identifier (SSID) made publicly known. Thus, in view of security, access points having a stealth function of intentionally hiding, after confirmation of connection to a desired wireless terminal, a group identifier (SSID) made publicly known to perform automatic detection, have been increased in recent years.

However, to be connected to, or to be accepted by, an access point having the stealth function of intentionally hiding the group identifier (SSID), it is necessary that a user of a wireless terminal preliminarily knows the group identifier (SSID) and individually performs the setting of the SSID. Thus, the user is preliminarily notified of the group identifier (SSID). Therefore, in view of security, leakage of information on the group identifier (SSID) becomes a problem.

Alternatively, an administrator of an access point cancels the stealth function and causes a user to select the group identifier (SSID) of an access point, which is to be accessed, from a list of those of access points that can be accessed. However, according to this method, the administrator of an access point and a user of a wireless terminal are required to perform complicated operations. Also, the convenience of the system is extremely hampered and the usability of the system is degraded.

SUMMARY OF THE INVENTION

An aspect of the present invention is to easily construct a network even in a case where group identification information is intentionally hidden.

Another aspect of the present invention is to facilitate the joining of a wireless terminal to an AP, which hides the group identification information, in a network. Still another aspect of the present invention is to enable easy access to a network while maintaining a security level.

In one aspect of the present invention, a communication apparatus includes a hiding unit configured to hide group identification information, a receiving unit configured to receive a search signal from an additional communication apparatus when the group identification information is hidden by the hiding unit, a determination unit configured to, based on information included in the search signal received by the receiving unit, determine whether to notify the additional communication apparatus of the group identification information, and a notifying unit configured to notify the additional communication apparatus of the group identification information according to determination performed by the determination unit.

In another aspect of the present invention, a communication system includes a first communication apparatus, and a second communication apparatus. In the communication system, the first communication apparatus includes a first transmitting unit configured to transmit a notification signal while hiding group identification information, a determination unit configured to, based on information included in a predetermined message received from the second communication apparatus, determine whether to notify the second communication apparatus of the group identification information, and a notifying unit configured to notify the second communication apparatus of the group identification information according to determination performed by the determination unit. The second communication apparatus includes a second transmitting device configured to transmit the predetermined message, and a selecting unit configured to, when the group identification information is included in a response message from the first communication apparatus, select desired group identification information.

In still another aspect of the present invention, a communication method includes a determination step of, based on information included in a search signal sent from an additional communication apparatus when group identification information is hidden, determining whether to notify the additional communication apparatus of the group identification information, and a notifying step of notifying the additional communication apparatus of the group identification information according to determination performed in the determination step.

In yet another aspect of the present invention, a communication method comprising a first transmitting step of transmitting a predetermined message from a second communication apparatus to a first communication apparatus when the first communication apparatus hides group identification information, a first determination step of causing the first communication apparatus to, based on information included in the predetermined message, determine whether to notify the second communication apparatus of the group identification information, a second transmitting step of causing the first communication apparatus to transmit a response signal including the group identification signal to the second communication apparatus according to determination performed in the first determination step, a second determination step of causing the second communication apparatus to determine whether the group identification information is included in the response signal, and a displaying step of displaying the group identification information according to determination performed in the second determination step.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate various embodiments, features and aspects of the present invention and, together with the description, serve to explain the principles of the invention.

FIG. 10 is a diagram illustrating an exemplary output format of terminal information in the wireless terminal in the second embodiment.

DETAILED DESCRIPTION OF THE EMBODIMENTS

Various embodiments, aspects and features of the present invention will now be herein described in detail below with reference to the drawings.

First Exemplary Embodiment

Figure 1:
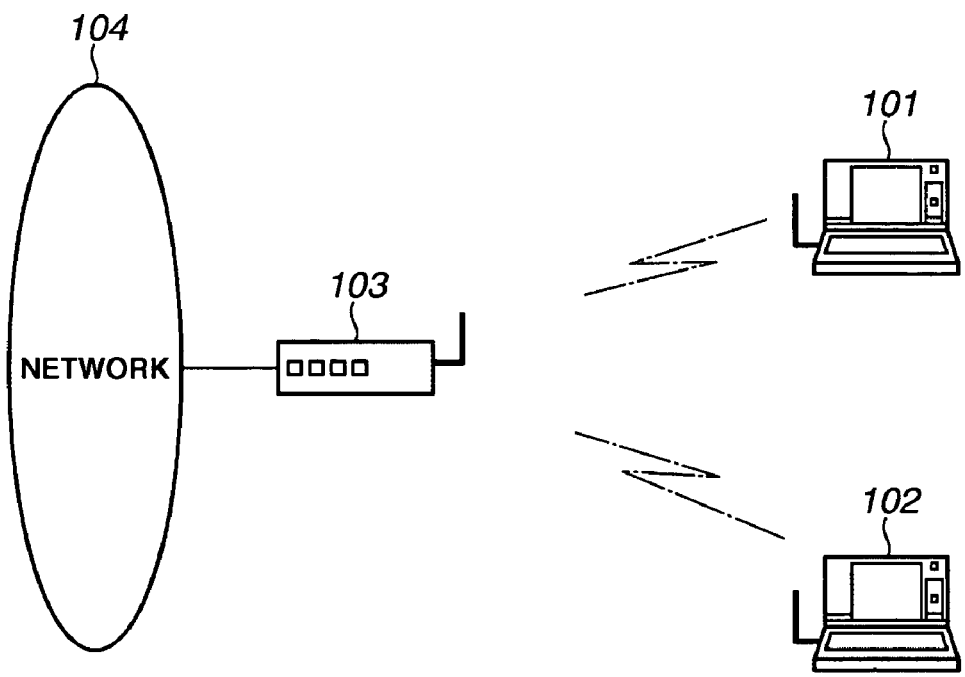
FIG. 1 is a diagram illustrating an example of the configuration of a wireless communication system according to a first embodiment of the present invention.

FIG. 1 is a diagram illustrating an example of the configuration of a wireless communication system according to a first embodiment of the present invention. An access point 103 (hereinafter referred to as "AP") constructs a wireless network in an infrastructure mode compliant with IEEE802.11. The AP 103 is wired to a network 104 and provides a data-transport-control/routing function for transporting data to and from each communication terminal on the network 104. Also, the AP 103 establishes a wireless link with each of the wireless terminals 101, 102 and so on, which have a wireless communication function. For exemplary purposes, the wireless terminals 101 and 102 shown in FIG. 1 may a laptop PC, a digital camera, or the like.

Figure 2:
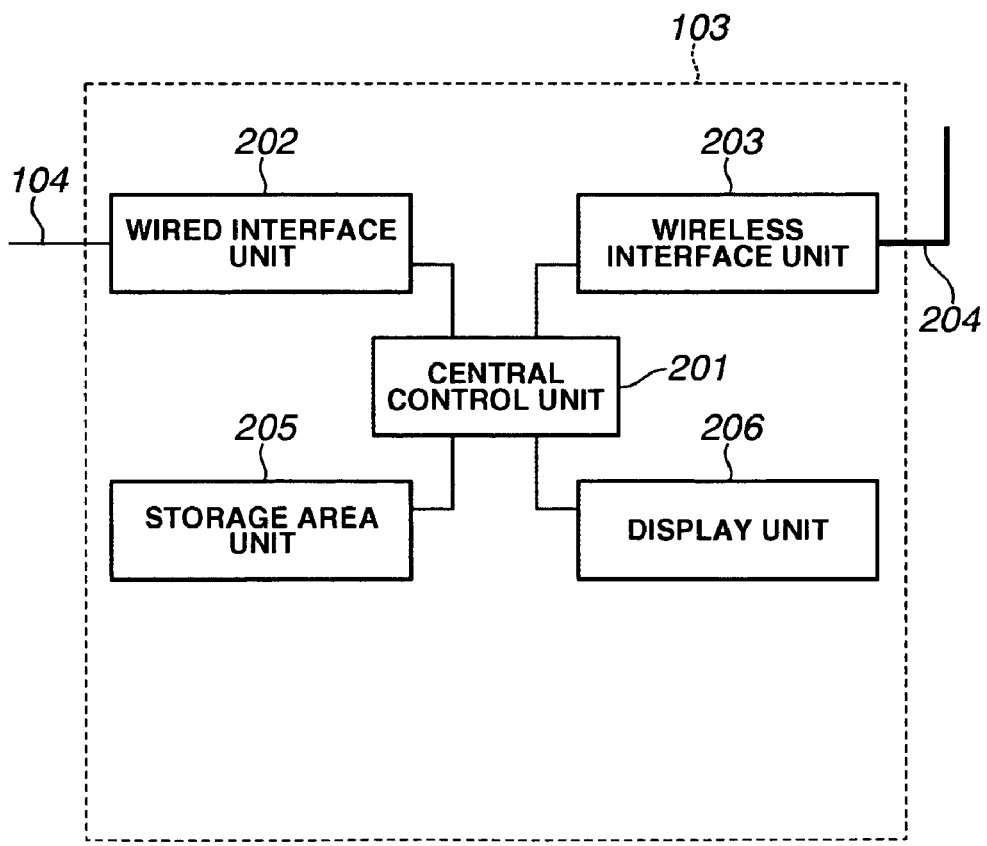
FIG. 2 is a block diagram illustrating an exemplary internal configuration of an access point in the first embodiment.

FIG. 2 is a block diagram illustrating an exemplary internal configuration of the AP 103 in the first embodiment. A central control unit (CPU) 201 shown in FIG. 2 performs the system control of the entire AP 103. A wired interface unit 202 is connected to the network 104 using a LAN cable. A wireless interface unit 203 performs wireless communication with the wireless terminals 101 and 102 through an antenna 204. A storage area unit 205 includes a volatile memory, which includes a work area and a temporary area used by each of the other units of the AP 103, and also includes a non-volatile memory storing control programs and set data used by the CPU 201. A display unit 206, which includes a light emitting diode (LED) or a liquid crystal display (LCD), notifies an external unit of a state of the AP 103 when the initialization of, the setting of data in, and the maintenance of the AP 103.

Figure 3:
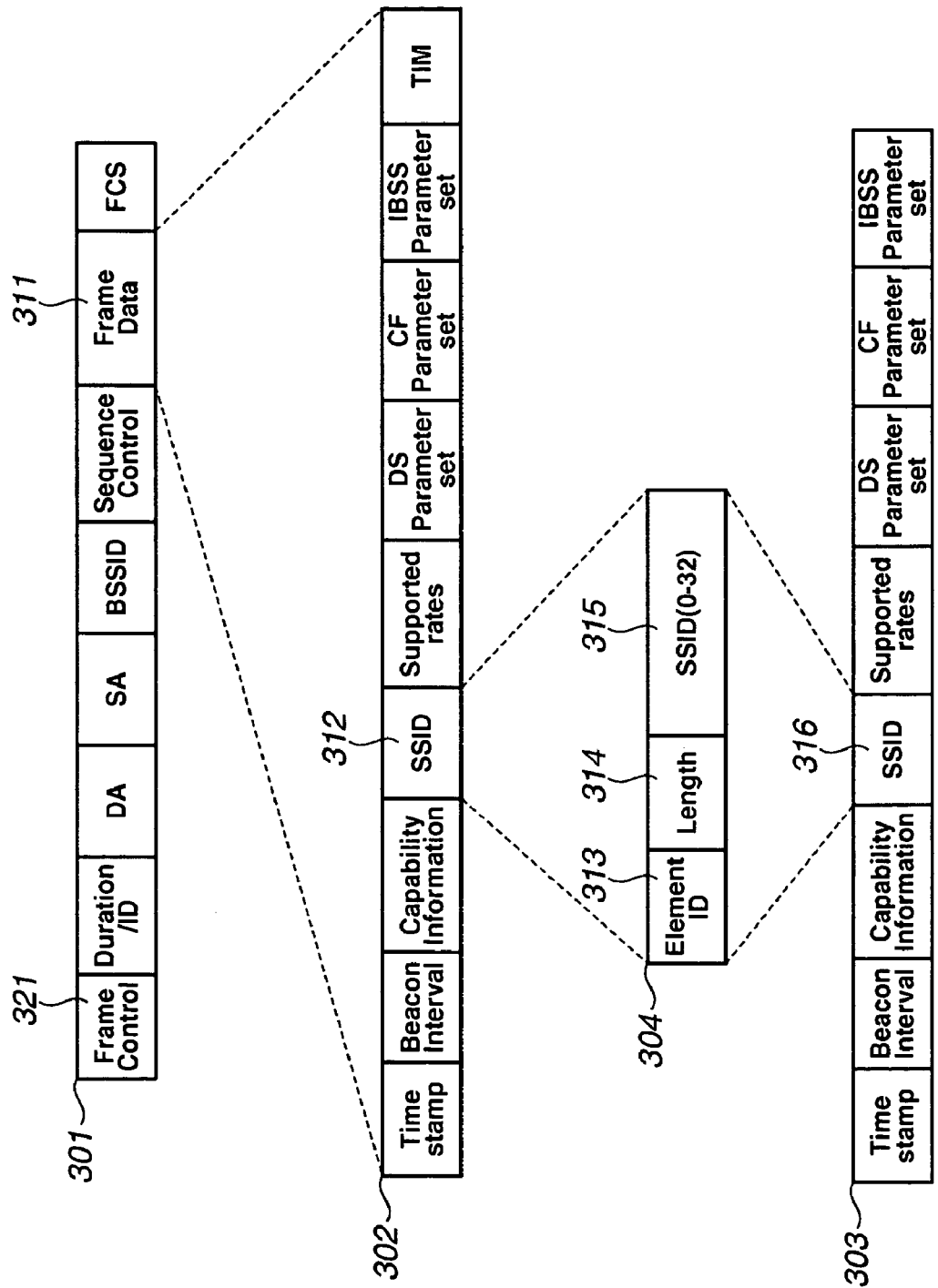
FIG. 3 is a diagram illustrating the MAC frame format of a management frame.

FIG. 3 is a diagram illustrating the MAC (Media Access Control) frame format of a management frame. In FIG. 3, reference numeral 301 designates the MAC frame of a management frame. Reference numeral 302 denotes an information element stored in a field for frame data 311 in a case where the subtype of a frame control field 321 is a "beacon". Reference numeral 312 denotes an SSID information element in a case where the subtype is a "beacon", and is a field in which information on the group identifier is set. Reference numeral 304 denotes a detail data structure of the SSID information element.

In the SSID information element 312, reference numeral 313 designates a field that stores an information element identifier (Element ID). Reference numeral 314 denotes a field in which information on the length of the SSID data set in an SSID region described below is stored. Reference numeral 315 designates the SSID region, the maximum length of which is 32 bytes. Reference numeral 303 designates an information element stored in the field for the frame data 311 in a case where the subtype of the frame control field 321 is a "probe response".

Figure 5:
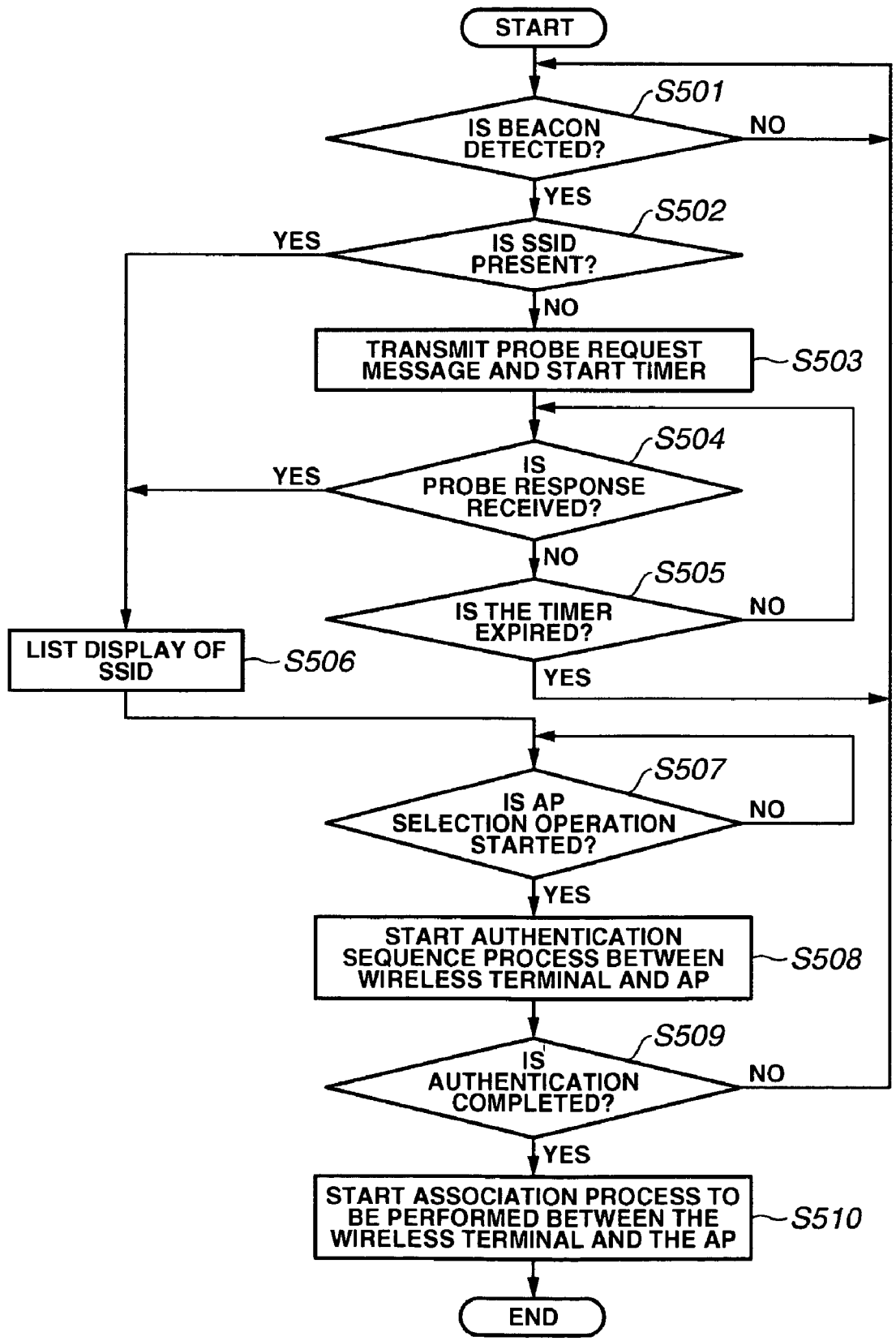
FIG. 5 is a flowchart illustrating exemplary processing performed in a wireless terminal in the first embodiment.
Figure 6:
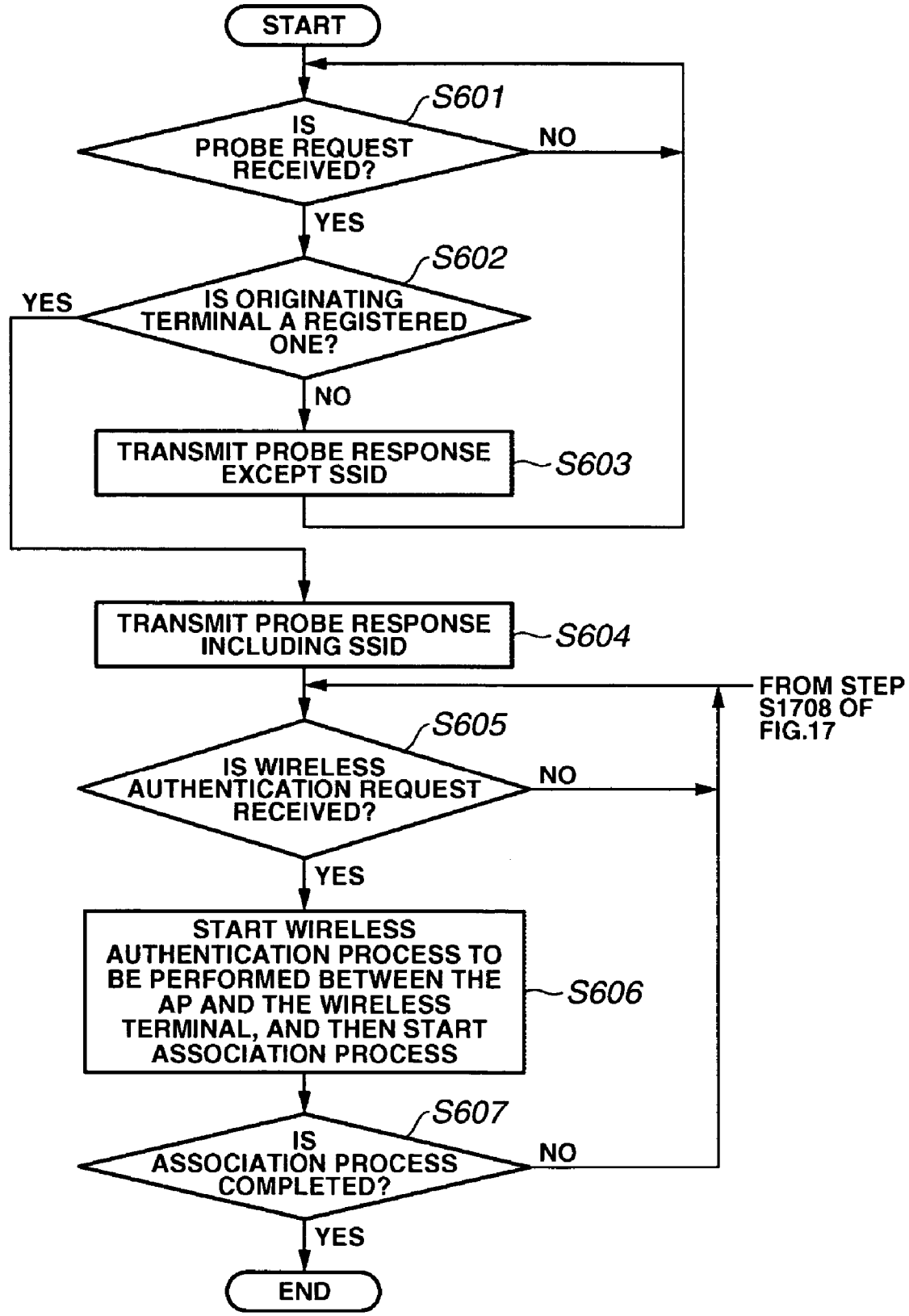
FIG. 6 is a flowchart illustrating exemplary processing performed at an access point in the first embodiment.

Hereunder, an operation of newly connecting and accommodating a wireless terminal when the AP 103 transmits a beacon, in which a group identifier (SSID) is intentionally hidden by performing the "stealth function", is described below with respect to FIGS. 4 through 6.

Figure 4:
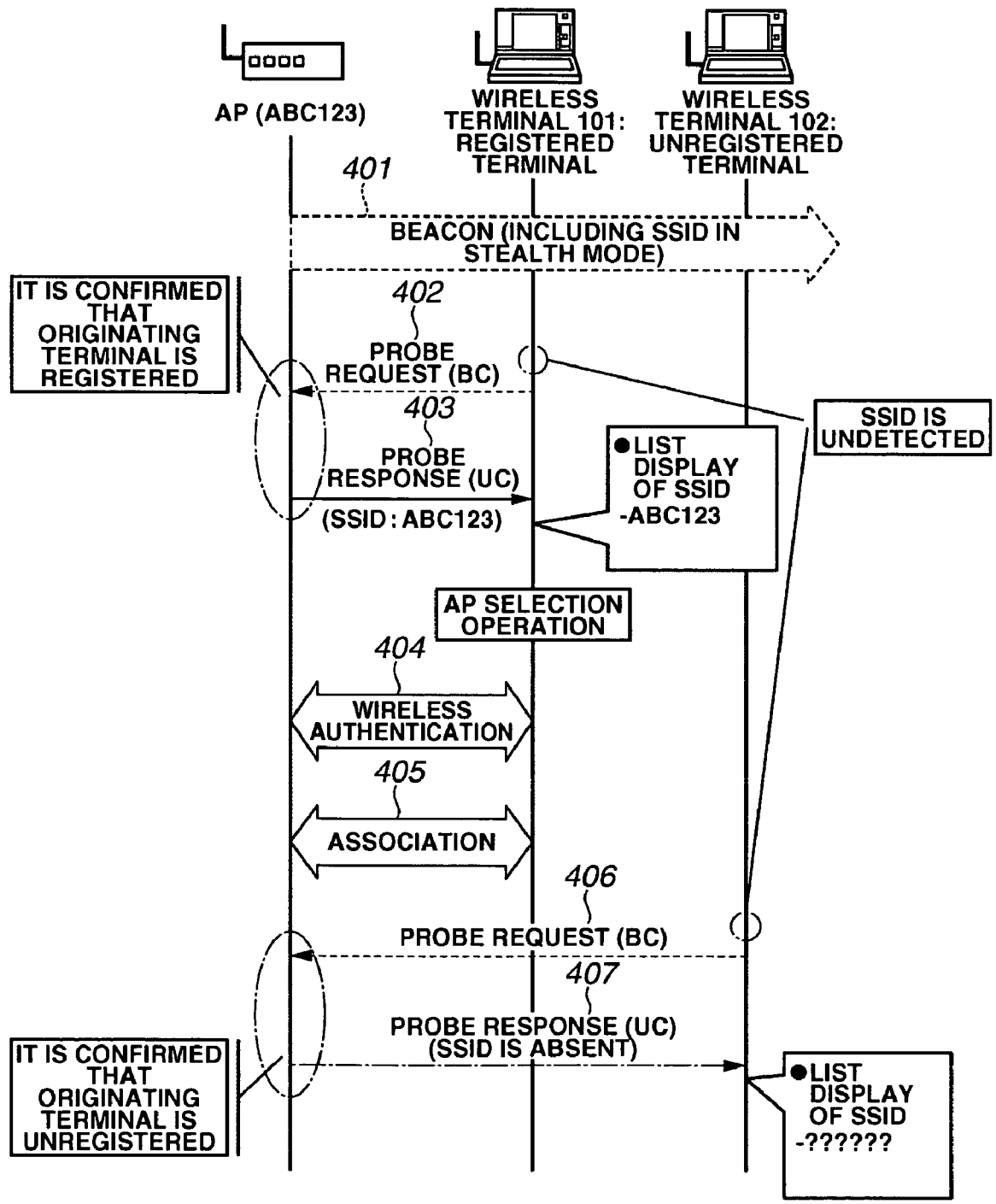
FIG. 4 is a sequence chart illustrating exemplary processing performed in the wireless communication system according to the first embodiment.

FIG. 4 is a sequence chart illustrating exemplary processing performed in the wireless communication system according to the first embodiment. FIG. 5 is a flowchart illustrating exemplary processing performed in a wireless terminal in the first embodiment. FIG. 6 is a flowchart illustrating exemplary processing performed at an AP in the first embodiment. For illustrative purposes, in the first embodiment, the AP 103 constructs a network by setting the group identifier (SSID) to be "ABC123".

When the AP 103 is activated in the sequence of processing in the wireless communication system shown in FIG. 4, the transmission of a beacon signal 401 is started. At that time, the SSID information element 312 stored in the field of the frame data 311 represented by the beacon signal 401 includes the field of the length 314, which represents "0". The field of the group identifier (SSID) 315 stores data representing "UNSET". Thus, the AP 103 is in the "ON" state in the "stealth function" previously discussed above.

Under this situation, when the wireless terminal 101 detects the beacon signal 401 (YES in step S501 of FIG. 5), it is determined in step S502 whether the group identifier (SSID) 315 is present in the SSID information element 312 of the beacon frame 302. In the state in which the "stealth function" is on, the group identifier (SSID) 315 is absent. Therefore, in step S503, the wireless terminal 101 transmits a probe request message 402 in a broadcast form so as to inquire whether a wireless cell is present therearound and to find any connectable AP. Also, a probe response timer is started.

When the AP 103 receives the probe request message 402 from the wireless terminal 101 (YES in step S601 of FIG. 6), the AP 103 checks in step S602 whether originating terminal identification information representing an originating terminal of the probe request message 402 is already registered as registered terminal information to be stored in the storage area unit 205. For example, information representing a MAC address is used as the originating terminal identification information and the registered terminal information. In a case where the wireless terminal 101 is a registered terminal (YES in step S602), data stored in the field of the length 314 included in the SSID information element 316 of the probe response frame 303 is set to a value other than "0". The group identifier (SSID=ABC123) is set in the SSID region 315. This probe response message 403 is transmitted in a unicast form to the wireless terminal 101 in step S604.

When the wireless terminal 101 receives the probe response message 403 (YES in step S504), the wireless terminal 101 checks the group identifier (SSID=ABC123) stored in the SSID region 315 and performs the list display of the group identifier (SSID=ABC123) in step S506. Consequently, the AP 103 is listed as a connectable access point.

In a case where the wireless terminal 101 cannot receive the probe response message 403 (NO in step S504), the wireless terminal 101 checks in step S505 whether the timer is expired. If not (NO in step S505), the state of the wireless terminal 101 is changed in step S504 to a state in which the wireless terminal 101 waits for a probe response message 403 from the AP 103. Subsequently, when the timer is expired (YES in step S505), the state of the wireless terminal 101 is changed in step S501 to a state in which the wireless terminal 101 detects a new beacon signal 401.

After the list display of the group identifier, the wireless terminal 101 determines in step S507 whether a user thereof performs an operation of selecting the group identifier. If the operation of selecting the group identifier is performed (YES in step S507), the wireless terminal 101 transmits a wireless authentication request, in which the selected group identifier is set, to the AP 103 and performs an authentication sequence process 404 in step S508. When the AP 103 receives this wireless authentication request (YES in step S605), the authentication sequence process 404 between the wireless terminal 101 and the AP 103 is performed in step S606.

Subsequently, upon completion of the authentication sequence process 404 (YES in step S509), an association process 405 between the wireless terminal 101 and the AP 103 is performed in step S510. Upon completion of this association process 405 (YES in step S607), the state of the wireless terminal 101 and the AP 103 is changed to an in-communication state.

When the AP 103 transmits a beacon signal 401 and receives a probe request message 406 from the wireless terminal 102 (YES in step S601), similarly to that from the wireless terminal 101, the AP 103 checks the registered terminal information (for instance, a MAC address) stored in the storage area unit 205. In a case where the terminal identification information of the wireless terminal 102 indicates that the wireless terminal 102 is an unregistered terminal (NO in step S602), the AP 103 transmits a probe response message 407, in which no group identifier is set, to the wireless terminal 102 in step S603. That is, the AP 103 transmits a probe response message 407, in which the field of the length 314 included in the SSID information element 316 of the probe response frame 303 represents "0" and in which the group identifier (SSID=ABC123) is not set in the SSID region 315, in a unicast form to the wireless terminal 102.

Consequently, when the wireless terminal 102 receives the probe response message 407 (YES in step S504), the wireless terminal 102 identifies the group identifier (SSID=?????) stored in the SSID region 315. As shown in FIG. 4, the wireless terminal 102 performs the list display of the group identifier (SSID=?????) as indicating an unconnectable access point. Thus, the wireless terminal 102 cannot be connected to the AP 103, so that a user of the wireless terminal 102 cannot select the AP 103.

Second Exemplary Embodiment

Next, a second embodiment of the present invention is described in detail below. In the second embodiment, a plurality of wireless terminals constitutes an ad hoc network.

Figure 7:
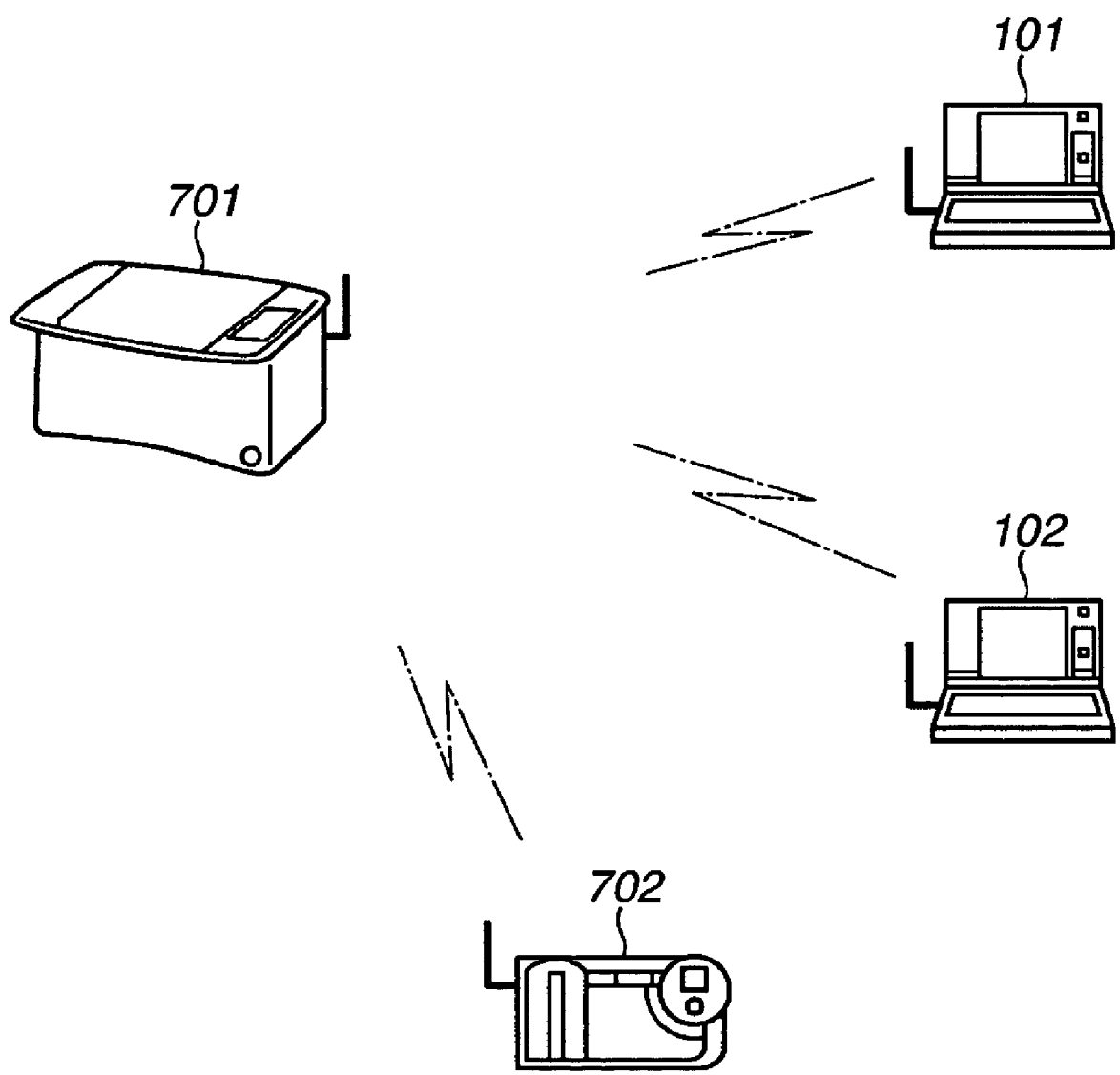
FIG. 7 is a diagram illustrating an example of the configuration of a wireless communication system according to a second embodiment of the present invention.

FIG. 7 is a diagram illustrating an example of the configuration of a wireless communication system according to the second embodiment of the present invention. In FIG. 7, reference numeral 701 designates a wireless terminal. The wireless terminals 701, 101, and 102 constitute an ad hoc network, having the group identifier (for illustrative purposes) of which is "ABC123." The wireless terminal 701, serving as an IBSS (Independent Basic Service Set) creator, notifies a predetermined area of a beacon frame, which is inherent in the ad hoc network. Reference numeral 702 denotes a wireless digital camera incorporating a wireless communication function, which is also considered part of the ad hoc network.

Figure 8:
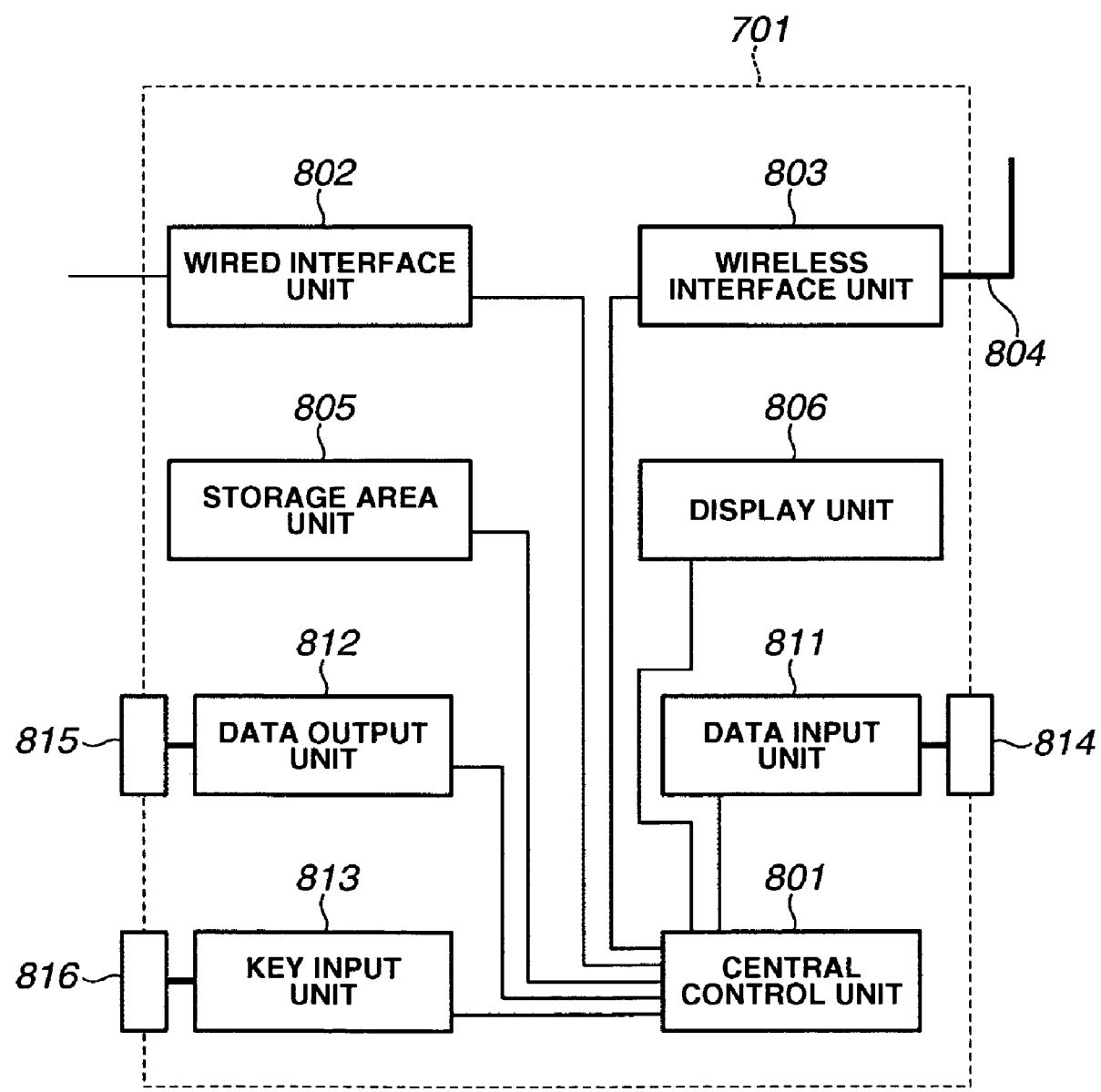
FIG. 8 is a block diagram illustrating an exemplary internal configuration of a wireless terminal in the second embodiment.

FIG. 8 is a block diagram illustrating an exemplary internal configuration of the wireless terminal 701 in the second embodiment. A central control unit 801, a wired interface unit 802, a wireless interface unit 803, an antenna 804, a storage area unit 805, and a display unit 806 are similar to those of the first embodiment shown in FIG. 2.

In FIG. 8, reference numeral 811 designates a data input unit connected to an interface to recording media, such as a CF (CompactFlash memory) card and a SD (Secure Digital) card, and to a scanner 814 operative to optically read data recorded on plain paper or the like. Reference numeral 812 denotes a data output unit connected to an interface with recording media, such as a CF card and an SD card, and to a printer 815 operative to print data on plain paper or the like. Reference numeral 813 designates a key input unit connected to various kinds of switches 816.

Hereinafter, a terminal information setting process is described. In the terminal information setting process, the wireless terminal 701 serving as the IBSS creator transmits a beacon signal in which the group identifier (SSID) is intentionally hided by the "stealth function", and thereby collects information on a wireless terminal that joins this ad hoc network.

Figure 9:
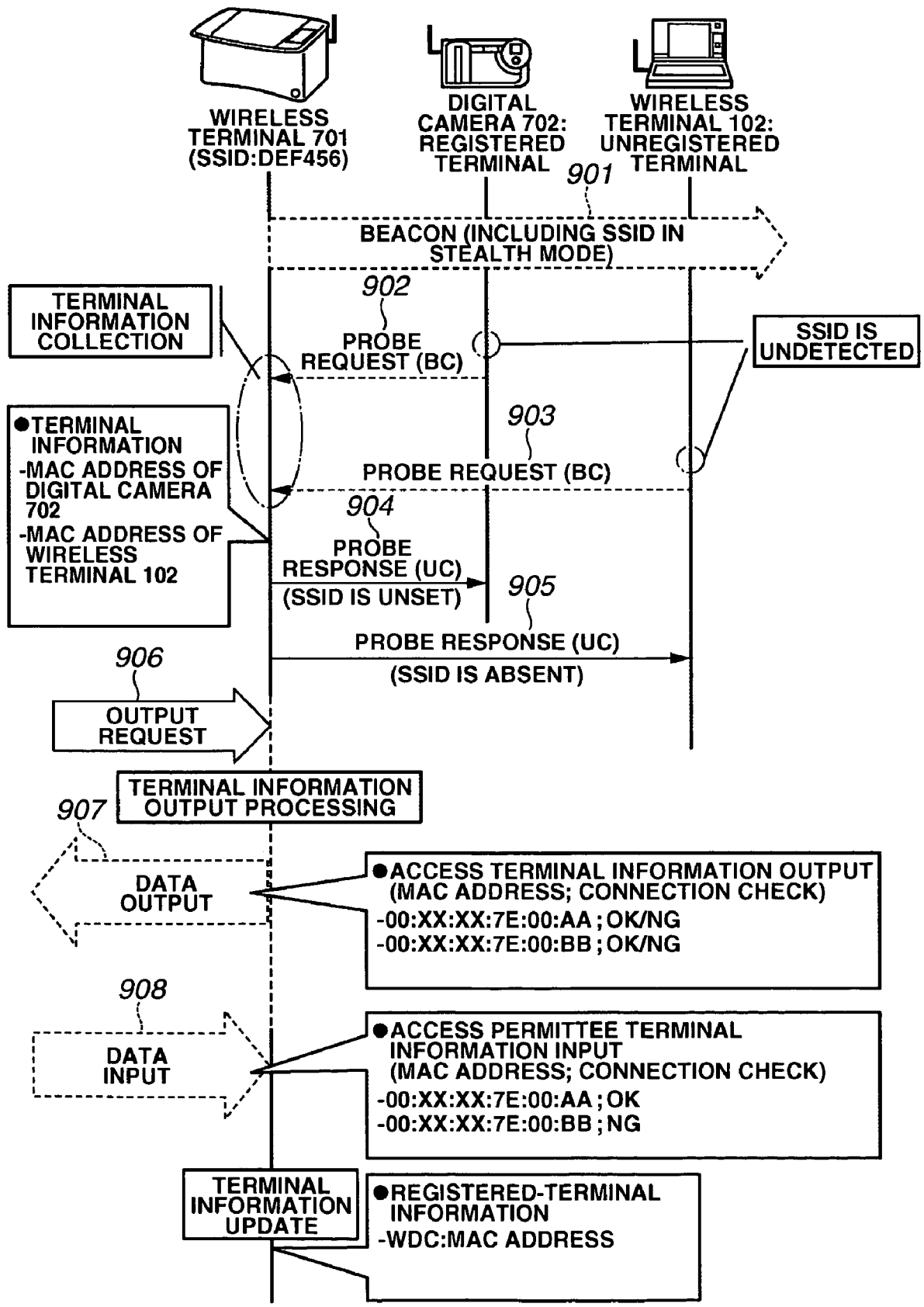
FIG. 9 is a sequence chart illustrating an exemplary terminal information setting process performed in the second embodiment.

FIG. 9 is a sequence chart illustrating an exemplary terminal information setting process performed in the second embodiment. FIG. 10 is a diagram illustrating an exemplary output format of terminal information in the wireless terminal 701 in the second embodiment. In FIG. 10, reference numeral 1001 designates a MAC address. The wireless terminal 701 is adapted to receive a probe request message transmitted from a wireless terminal, which is present in this ad hoc network, and to list a MAC address included in the probe request message. Reference numeral 1002 denotes connection check information to be recorded on a space and to be used by a user to check whether a wireless terminal corresponding to the MAC address 1001 can be connected and accepted.

Figure 11:
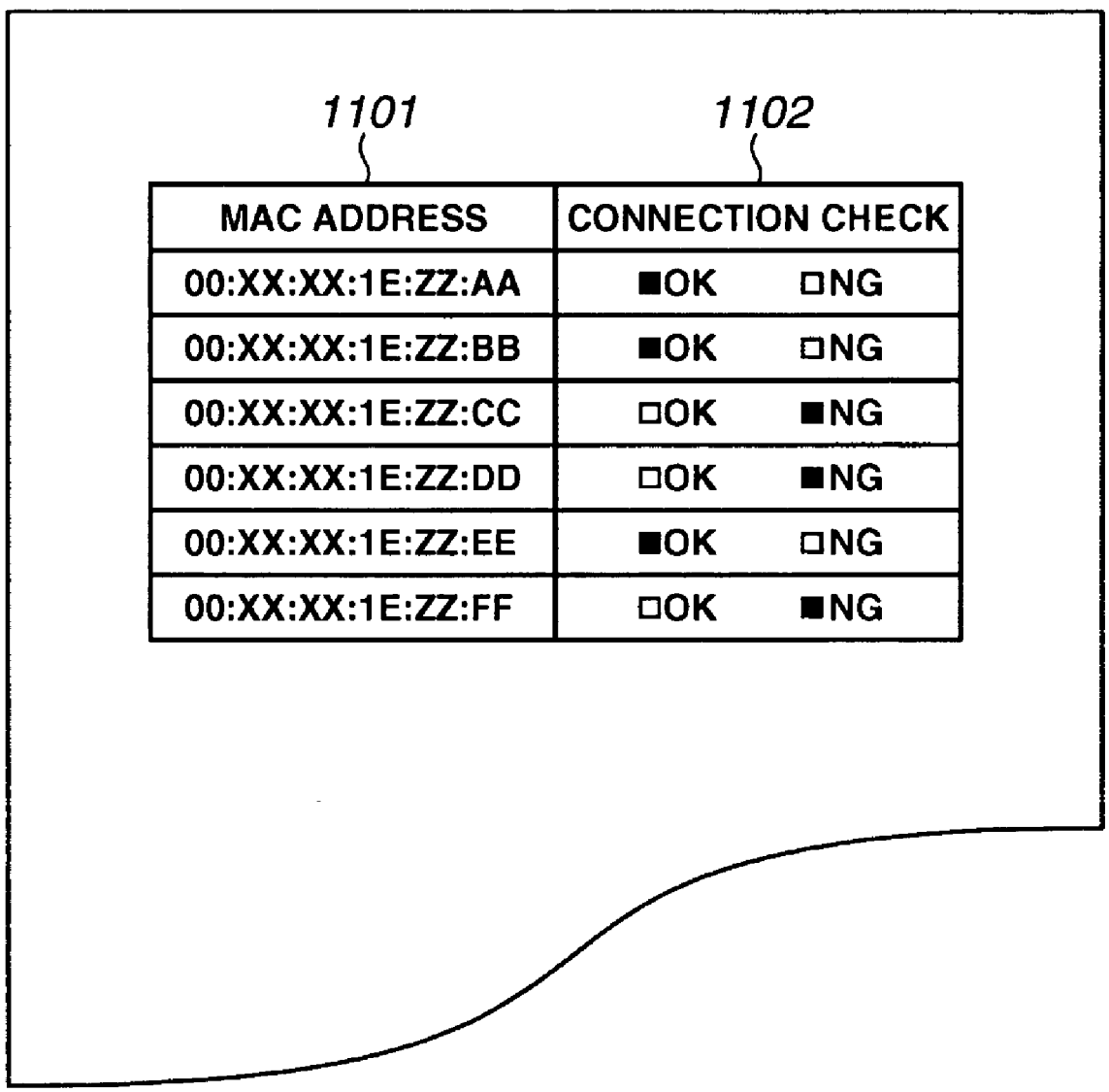
FIG. 11 is a diagram illustrating an exemplary input format of the terminal information in the wireless terminal in the second embodiment.

FIG. 11 is a diagram illustrating an input format of the terminal information in the wireless terminal 701 in the second embodiment. The MAC address 1101 shown in FIG. 11 is similar to the MAC address 1001 shown in FIG. 10. A connection check 1102 is an example of recorded data that is used in a case where a user checks whether a wireless terminal corresponding to the MAC address 1101 can be connected and accepted.

First, a method of newly registering a wireless terminal, the access from which is permitted, as terminals represented by the registered terminal information is described below.

In this scenario, the wireless terminal 701 serving as the IBSS creator determines a beacon interval and establishes synchronization with a plurality of wireless terminals to transmit and receive data to and from the plurality of wireless terminals. A certain time period starting from the commencement of this beacon interval, that is, a moment at which a beacon signal is transmitted, is referred to as an "ATIM (Announcement Traffic Indication Message) window." In the IBSS, the wireless terminal 701 preliminarily notifies, to a terminal that is in a PS (Power Save) mode, transmission of the data using an ATIM frame to transmit a data frame. An ATIM is transmitted in a special time period referred to as the "ATIM window".

In this time period referred to as the "ATIM window", only the transmission of a beacon signal or an ATIM is permitted. The wireless digital camera 702 in a PS (Power Save) mode is in an awake state in which data can be transmitted and received. At that time, the wireless terminal 701 serving as the IBSS creator is in a state in which this terminal is transmitting a beacon signal 901. The SSID information element 312 stored in the field of the frame data 311 of the beacon signal 901 includes the field of the length 314, which represents "0". The field of the group identifier (SSID) 315 stores data representing "UNSET". Thus, the wireless terminal 701 is in a state in which the "stealth function" is on.

Under this situation, when the wireless digital camera 702 detects the beacon signal 901, the group identifier (SSID) 315 is absent in the field of the SSID information element 312 of the beacon frame 302. Therefore, the wireless digital camera 702 transmits a probe request message 902 in a broadcast form so as to inquire of the wireless terminal 701 whether a wireless cell is present therearound, and so as to find the wireless terminal 701, which can be connected to and can accept the wireless digital camera 702. Also, a probe response timer is started.

When the wireless terminal 701 receives the probe request message 902 from the wireless digital camera 702, the wireless terminal 701 analyzes the message. Consequently, terminal identification information (for example, a MAC address) unique to the wireless digital camera 702, which is included in the probe request message 902, is stored in an area, in which access terminal information is stored, in the storage area unit 805.

Similarly, when the wireless terminal 102 detects the beacon signal 901, the group identifier (SSID) 315 is absent in the field of the SSID information element 312. Therefore, the wireless terminal 102 transmits a probe request message 903 in a broadcast form so as to inquire of the wireless terminal 701 whether a wireless cell is present therearound, and so as to find the wireless terminal 701, which can be connected to and can accept the wireless terminal 102. Also, a probe response timer is started.

When the wireless terminal 701 receives the probe request message 903 from the wireless terminal 102, the wireless terminal 701 analyzes the message. Consequently, terminal identification information (for example, a MAC address) unique to the wireless terminal 102, which is included in the probe request message 902, is stored in an area, in which access terminal information is stored, in the storage area unit 805.

Then, the wireless terminal 701 transmits probe response messages 904 and 905, in each of which no group identifiers are set, to the wireless digital camera 702 and the wireless terminal 102, respectively. That is, the probe response messages 904 and 905, in each of which the field of the length 314 included in the SSID information element 316 of the probe response frame 303 represents "0" and in which no group identifiers are set in the SSID region 315, are transmitted in a unicast form to the wireless digital camera 702 and the wireless terminal 102, respectively.

Consequently, when the wireless digital camera 702 and the wireless terminal 102 receive the probe response messages 904 and 905, the wireless digital camera 702 and the wireless terminal 102 identify the group identifier (SSID=UNSET) stored in the SSID region 315. The wireless digital camera 702 and the wireless terminal 102 list the wireless terminal 701 as an unconnectable wireless terminal. At that time, because the wireless terminal 701 cannot be connected, users of the wireless digital camera 702 and the wireless terminal 102 cannot select the wireless terminal 701.

As stated above, the terminal identification information (for instance, MAC addresses) concerning the probe request messages 902 and 903 received by the wireless terminal 701 from the wireless digital camera 702 and the wireless terminal 102 is stored as the access terminal information in the storage area unit 805 of the wireless terminal 701. The access terminal information differs from the registered terminal information (for instance, the MAC address) that is described in the first embodiment and that represents a terminal, the connection from which is permitted.

Subsequently, a user operates a switch according to state display information indicated by the display unit 806 of the wireless terminal 701 to thereby perform an access terminal information output request 906 on the key input unit 813. Consequently, the key input unit 813 notifies the central control unit 801 of the output request 906. The central control unit 801 reads the access terminal information from the storage area unit 805 and transfers the read access terminal information to the data output unit 812. Then, the data output unit 812 transmits output data of the output format shown in FIG. 10 to the printer 815. Then, the output data is printed on plain paper (907).

At that time, the user selects the wireless terminal, the access from which is permitted, according to the MAC address 1001 shown in FIG. 10. Then, the user changes the connection check column 1002 to the connection check column 1102 shown in FIG. 11. Subsequently, the user sets a sheet of printing paper, on which the changed connection check column 1102 has been printed, in the scanner 814. Then, the user operates a switch according to the state display information indicated by the display unit 806 to perform a data input request (908) to the key input unit 813.

Consequently, the central control unit 801 takes input data of the input format shown in FIG. 11 as access permittee terminal information in the data input unit 811 from the scanner 814. Then, terminal identification information (the MAC address) indicating each terminal, the associated OK cell of the connection check column 1102 of which is checked off, is extracted. Subsequently, the extracted information is stored in the storage area unit 805 as the registered terminal information (for example, the MAC address) representing the wireless terminal, the access from which is permitted. Conversely, terminal identification information (the MAC address) indicating each terminal, the associated NG cell of the connection check column 1102 of which is checked off, is extracted. Subsequently, the extracted information is stored in the storage area unit 805 as the rejected terminal information (for instance, the MAC address) representing the wireless terminal, the access from which is rejected. In this case, the MAC address of the wireless digital camera 702 is registered as the registered terminal information, while the MAC address of the wireless terminal 102 is registered as the rejected terminal information.

A process performed by the wireless terminal 701 in the wireless communication system of the ad hoc network upon completion of newly registering the information on the wireless terminal, the access from which is permitted, as the registered terminal information is described below.

Figure 12:
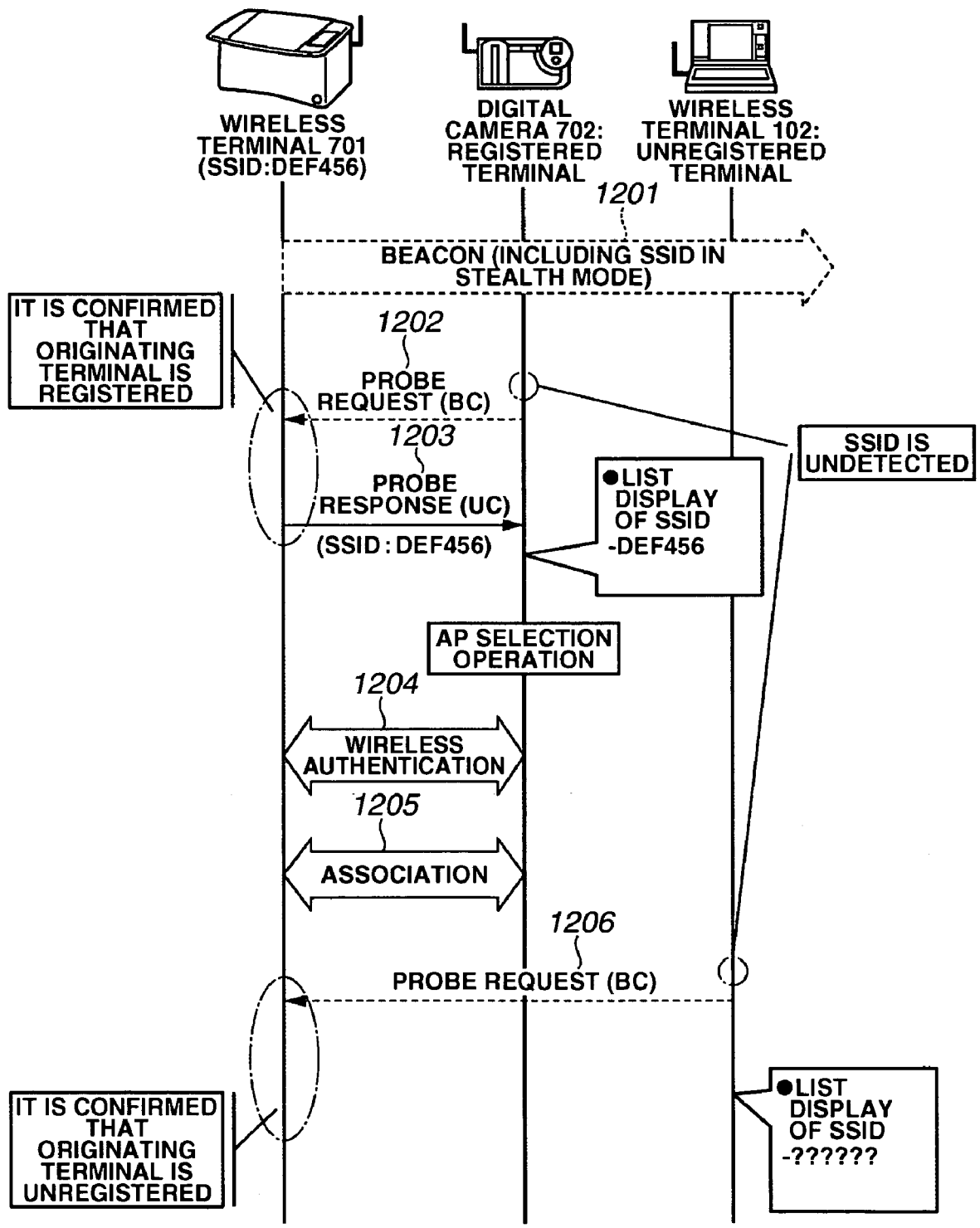
FIG. 12 is a sequence chart illustrating exemplary processing performed in a wireless communication system according to the second embodiment.
Figure 13:
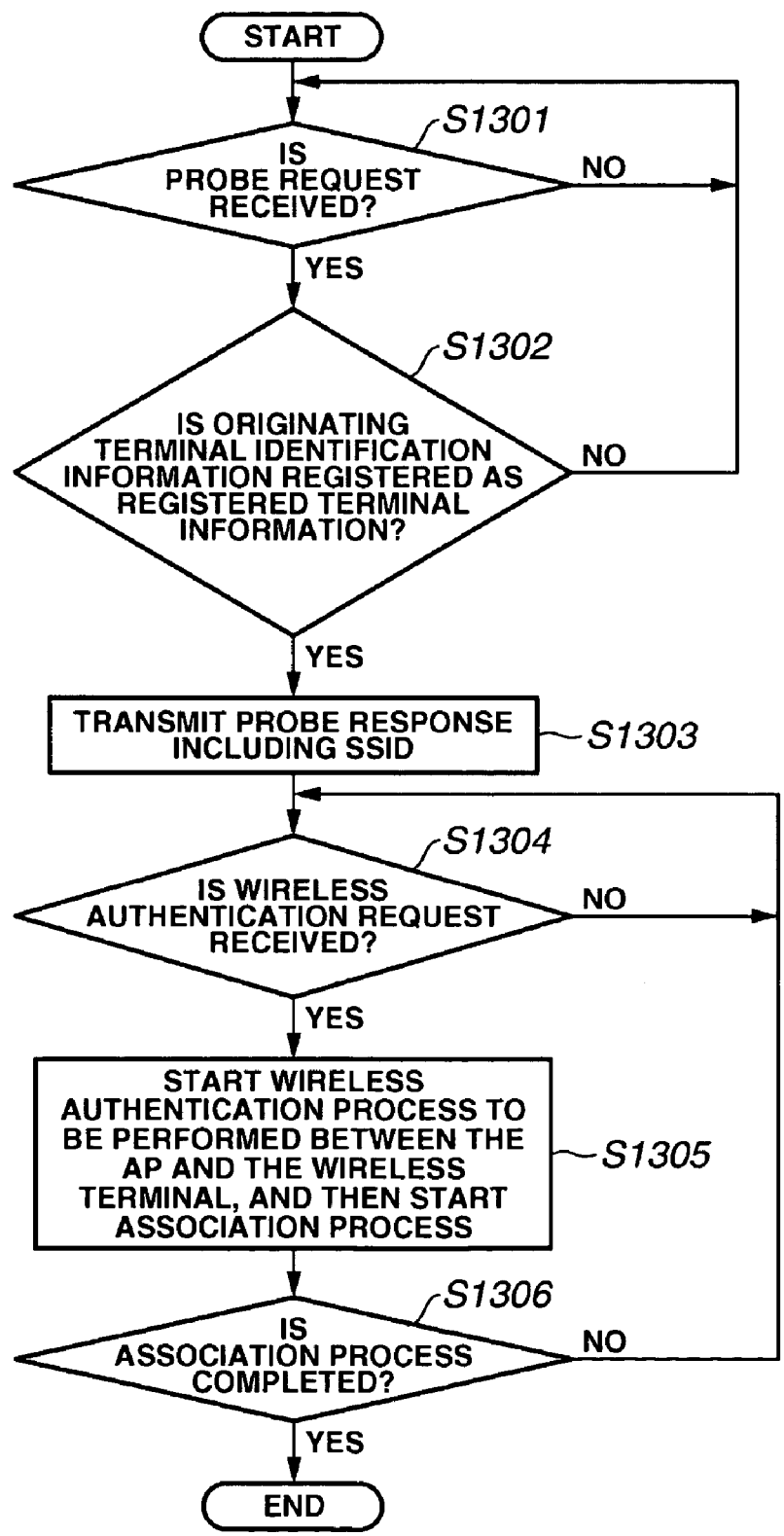
FIG. 13 is a flowchart illustrating exemplary processing performed in a wireless terminal in the second embodiment.

FIG. 12 is a sequence chart illustrating exemplary processing performed in a wireless communication system according to the second embodiment. FIG. 13 is a flowchart illustrating processing performed in a wireless terminal in the second embodiment. The processing performed by each of the wireless digital camera 702 and the wireless terminal 102 is described below by referring to the flowchart shown in FIG. 5 used in the description of the first embodiment.

In the sequence of processing performed in the wireless communication system shown in FIG. 12, the wireless terminal 701 is activated. Then, the transmission of a beacon signal 1201 is started. At that time, the SSID information element 312 in the field of the frame data 311 represented by the beacon signal 401 includes the length 314 that represents "0." The data set in the field of the group identifier (SSID) 315 represents "UNSET." Thus, the wireless terminal 701 is in a state in which the "stealth function" is on.

Under this situation, when the wireless digital camera 702 detects the beacon signal 1201 (YES in step S501), the group identifier (SSID) 315 is absent in the SSID information element 312 of the beacon frame 302 (step S502). Therefore, in step S503, the wireless digital camera 701 transmits a probe request message 1202 in a broadcast form so as to inquire whether a wireless cell is present therearound, and so as to find a connectable and acceptable wireless terminal 701. Also, a probe response timer is started.

When the wireless terminal 701 receives the probe request message 1202 from the wireless digital camera 702 (YES in step S1301), the wireless terminal 701 checks the registered terminal information and the rejected terminal information (for example, the MAC address) stored in the storage area unit 805. At that time, in a case where the terminal identification information representing the wireless digital camera 702 is stored as the registered terminal information representing the registered terminal (YES in step S1302), the wireless terminal 701 transmits a probe response message 1203, in which the group identifier is set, to the wireless digital camera 702 in step S1303. That is, the probe response message 1203, in which the length 314 included in the SSID information element 316 represents a value other than "0" and in which the group identifier (SSID=DEF456) is set in the SSID region 315, is transmitted in a unicast form to the wireless digital camera 702.

Consequently, when the wireless digital camera 702 receives the probe response messages 1203 (YES in step S504), the wireless digital camera 702 identifies the group identifier (SSID=DEF456) stored in the SSID region 315. The wireless digital camera 702 performs the list display of the group identifier (SSID=DEF456) in step S506.

In a case where the wireless digital camera 702 cannot receive the probe response message 1203 (NO in step S504), the wireless digital camera 702 checks in step S505 whether the time is expired. If the timer is not expired (NO in step S505), the state of the wireless digital camera 702 is changed in step S504 to a state in which the wireless digital camera 702 waits for the probe response message 1203 from the wireless terminal 701. Thereafter, when the time is expired (YES in step S505), the state of the wireless digital camera 702 is changed in step S501 to a state in which the wireless digital camera 702 detects a new beacon signal 1201.

After the list display of the group identifier is performed, the wireless digital camera 702 determines in step S507 whether a user of the wireless digital camera 702 performs an operation of selecting the group identifier. If the operation of selecting the group identifier is performed (YES in step S507), the wireless digital camera 702 transmits a wireless authentication request, in which the selected group identifier is set, to the wireless terminal 701. Then, the wireless digital camera 702 performs an authentication sequence process 1204 in step S508. At that time, when the wireless terminal 701 receives this wireless authentication request (YES in step S1304), an authentication sequence process 1204 is performed between the wireless terminal 701 and the wireless digital camera 702. Subsequently, an association process 1205 is performed in step S1305.

Upon completion of this authentication sequence process 1204 (YES in step S509), the association process 1205 between the wireless digital camera 702 and the wireless terminal 701 is performed in step S510. Upon completion of this association process 1205 (YES in step S1306), the state of the wireless digital camera 702 and the wireless terminal 701 is changed to an in-communication state.

Similarly to the case of the wireless digital camera 702, when the wireless terminal 701 receives a probe request signal 1206 from the wireless terminal 102 (YES in step S1301), the process proceeds to step S1302. The wireless terminal 701 checks the registered terminal information and the rejected terminal information (for example, the MAC address) stored in the storage area unit 805 in step S1302. In a case where the terminal identification information representing the wireless terminal 102 is registered as the rejected terminal information (NO in step S1302), the wireless terminal 701 does not transmit a probe response message to the wireless terminal 102. The state of the wireless terminal 701 is changed in step S1301 to a probe request reception state.

Consequently, a user using the wireless terminal 102 cannot know the presence of the wireless terminal 701. Thus, the user cannot select the wireless terminal 701 as a connection destination wireless terminal.

Third Exemplary Embodiment

Next, a third embodiment of the present invention is described in detail below. Although the AP 103 in the first embodiment determines, with reference to the registered terminal information stored in the storage area unit 205, whether a wireless terminal is a registered one, a host computer connected to the wireless terminal through the network 104 in the third embodiment determines whether the wireless terminal is a registered one.

Figure 14:
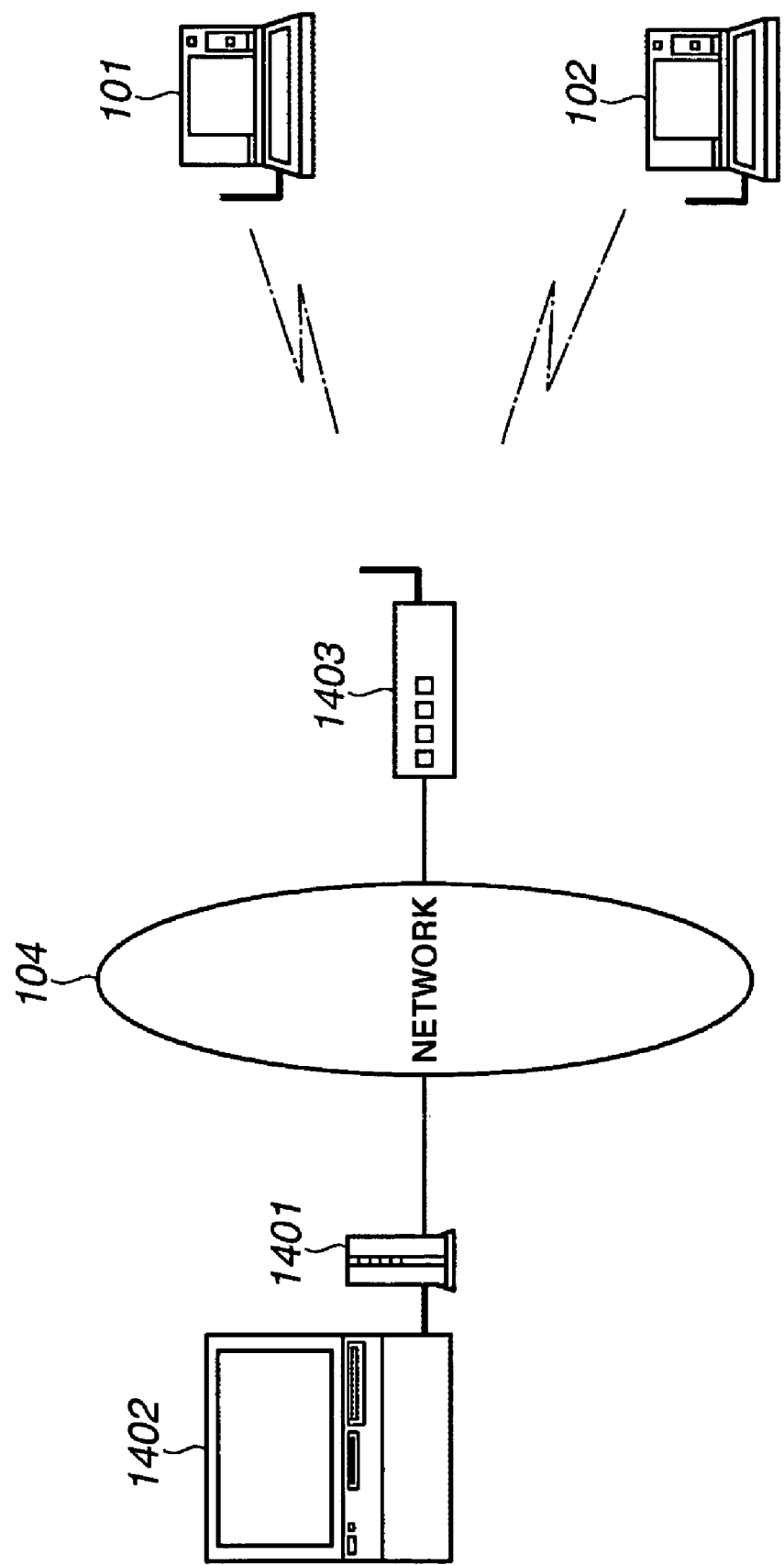
FIG. 14 is a diagram illustrating an example of the configuration of a wireless communication system according to a third embodiment of the present invention.

FIG. 14 is a diagram illustrating an example of the configuration of a wireless communication system according to the third embodiment of the present invention. As shown in FIG. 14, the third embodiment is configured by adding a host computer (PC) 1401 and an input/output display 1402 to the configuration of the first embodiment, which is shown in FIG. 1. Further, an access point AP 1403 is included in the network.

Figure 15:
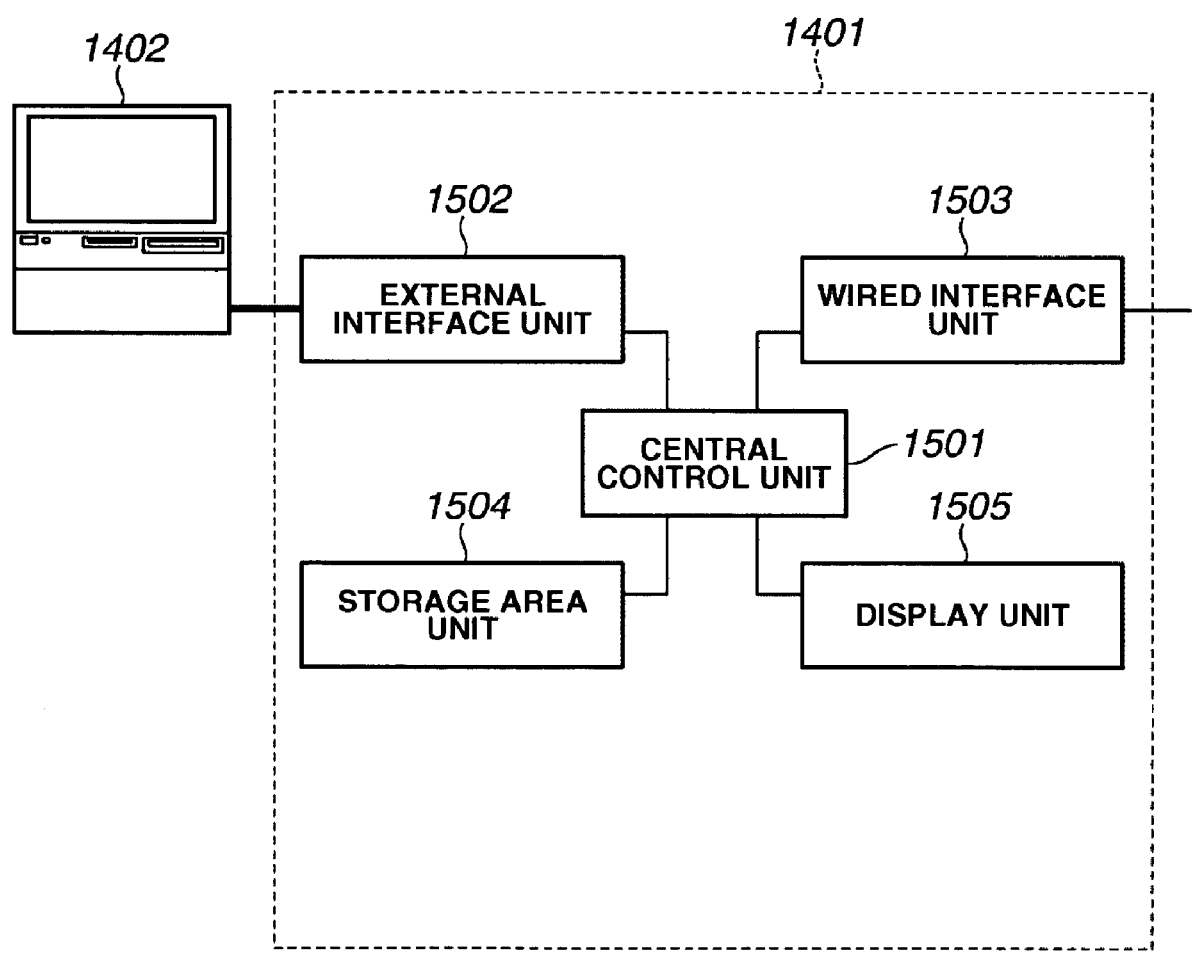
FIG. 15 is a block diagram illustrating an exemplary internal configuration of a host PC according to the third embodiment.

FIG. 15 is a block diagram illustrating an exemplary internal configuration of the host PC 1401 according to the third embodiment. In FIG. 15, a central control unit 1501, a wired interface unit 1503, a storage area unit 1504, and a display unit 1505 are similar to those shown in FIG. 2. An external interface unit 1502 is connected to the input/output display 1402 through a cable.

Hereinafter, a process of newly connecting and accepting a registered terminal is described when the AP 1403 transmits a beacon signal while intentionally hiding the group identifier (SSID) by performing the "stealth function".

The third embodiment is configured so that a terminal inquires of the host PC 1401 connected to the network 104 whether a wireless terminal is registered, and that according to a result of the inquiry, a registered terminal is newly connected and accepted.

Figure 16:
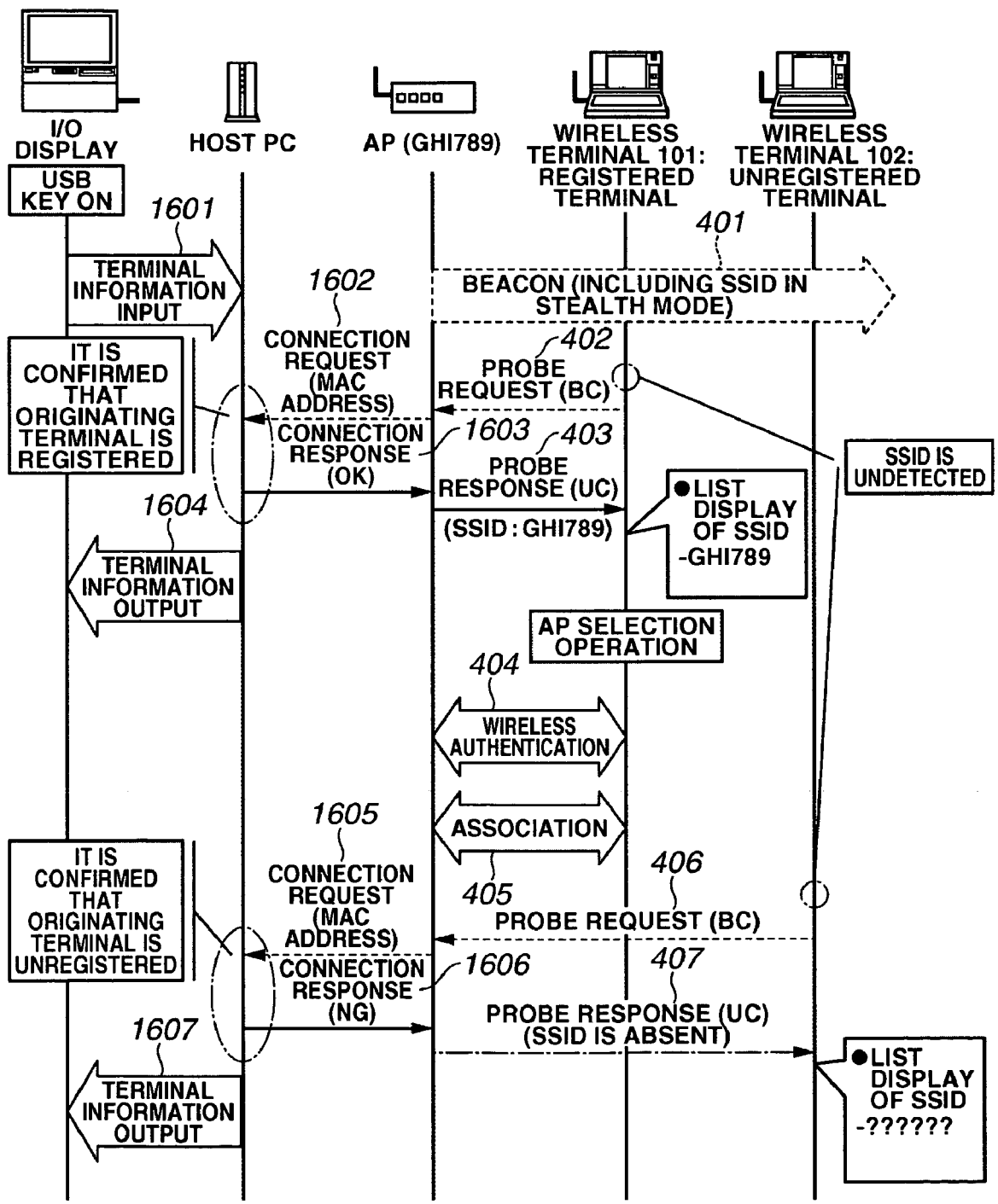
FIG. 16 is a sequence chart illustrating an exemplary wireless communication system according to the third embodiment.
Figure 17:
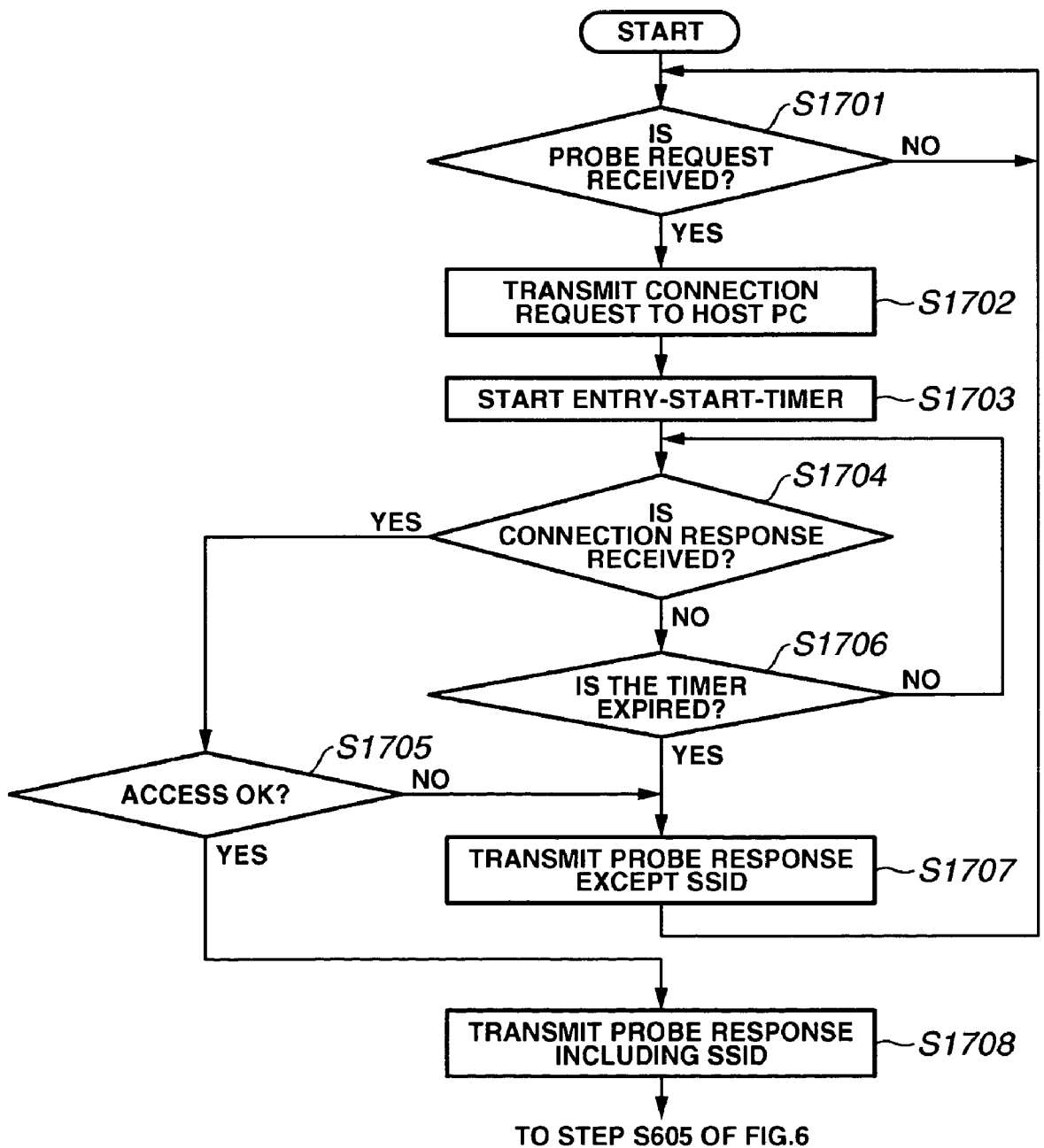
FIG. 17 is a flowchart illustrating exemplary processing performed at an access point in the third embodiment.
Figure 18:
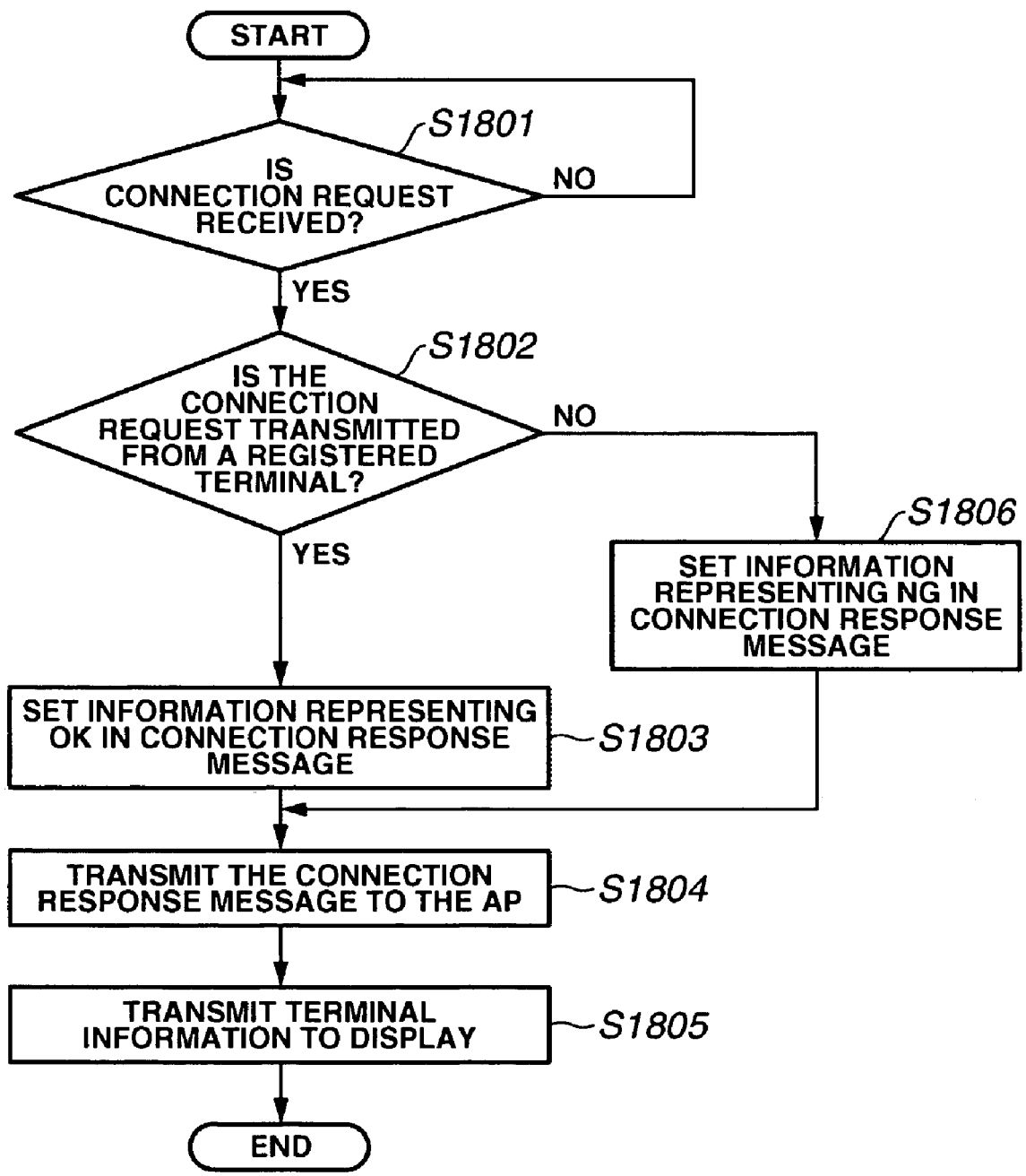
FIG. 18 is a flowchart illustrating exemplary processing performed by the host PC in the third embodiment.

FIG. 16 is an exemplary sequence chart illustrating a wireless communication system according to the third embodiment. FIG. 17 is a flowchart illustrating exemplary processing performed at the AP 1403 in the third embodiment. While, FIG. 18 is a flowchart illustrating exemplary processing performed by the host PC in the third embodiment.

In the sequence of processing performed in the wireless communication system shown in FIG. 16, first, a user sets a USB (Universal Serial Bus) key, in which terminal identification information representing a terminal preliminarily permitted to access, in the input/output display 1402. The input/output display 1402 inputs the terminal identification information, which is stored in the USB key, to the host PC 1401 (1601). Subsequently, the AP 1403 is activated. The transmission of a beacon signal 401 is started. At that time, the SSID information element 312 stored in the field of the frame data 311 represented by the beacon signal 401 includes the field of the length 314, which represents "0." The field of the group identifier (SSID) 315 stores data representing "UNSET." Thus, the AP 1403 is in a state in which the "stealth function" is on.

Under this situation, when the wireless terminal 101 detects the beacon signal 401 (YES in step S501), the group identifier (SSID) 315 is absent in the SSID information element 312 of the beacon frame 302 (step S502). Therefore, in step S503, the wireless terminal 101 transmits a probe request message 402 in a broadcast form so as to inquire whether a wireless cell is present therearound, and so as to find a connectable and acceptable access point. Also, a probe response timer is started.

When the AP 1403 receives the probe request message 402 from the wireless terminal 101 (YES in step S1701; See FIG. 17), the processing proceeds to step S1702. In step S1702, the AP 1403 transmits a connection request message 1602, which includes terminal identification information (the MAC address) of the wireless terminal 101 extracted from the received probe request message 402, to the host PC 1401. Then, in step S1703, an entry-start-timer is started.

Consequently, when the host PC 1401 receives the connection request messages 1602 (YES in step S1801; See FIG. 18), the host PC 1401 checks the registered terminal information (for instance, the MAC address) stored in the storage area unit 1504. If the terminal identification information of the wireless terminal 101 indicates the registered terminal (YES in step S1802), information indicating the access permit (for instance, OK) is set in a connection response message 1603 in step S1803. Then, the host PC 1401 transmits the connection response message 1603 to the AP 1403 in step S1804.

The host PC 1401 performs output 1604 of terminal identification information of the wireless terminal 101 to the input/output display 1402 through the external interface unit 1502 in step S1805 so as to display the terminal identification information of the wireless terminal 101 in the input/output display 1402. Consequently, the terminal identification information of the wireless terminal 101 is displayed in the input/output display 1402 as information representing a terminal, the access from which is permitted.

When, the AP 1403 receives the connection response message 1603 (YES in step S1704), the AP 1403 checks the access permit "OK" or the disapproval "NG" included in the connection response message 1603 in step S1705. If an access is permitted (YES in step S1705), the AP 1403 transmits a probe response message 403, in which the group identifier is set, in a unicast form to the wireless terminal 101 in step S1708. That is, the probe response message 403, in which the length 314 included in the SSID information element 316 of the probe response frame 303 represents a value other than "0" and in which the group identifier (SSID=GHI789) is set in the SSID region 315, is transmitted in a unicast form to the wireless terminal 101. After the process of step S1708 in FIG. 17, processes to be performed are similar to the processes from step S605 to step S607 in FIG. 6 as described below.

When the wireless terminal 101 receives the probe response message 403 (YES in step S504), the wireless terminal 101 identifies the group identifier (SSID=GHI789)

stored in the SSID region 315. Then, the wireless terminal 101 performs the list display of the group identifier (SSID=GHI789) in step S506. Consequently, the AP 1403 can be listed as a connectable access point.

Conversely, if the wireless terminal 101 cannot receive the probe response message 403 (NO in step S504), the wireless terminal 101 checks in step S505 whether the timer is expired. If the timer is not expired (NO in step S505), the state of the wireless terminal 101 is returned in step S504 to a state in which the terminal 101 waits for a probe response message 403 from the AP 103. Thereafter, if the timer is expired (YES in step S505), the state of the wireless terminal 101 is changed in step S501 to a state in which the terminal 101 tries to detect a new beacon signal 401.

After the list display of the group identifier, the wireless terminal 101 determines in step S507 whether a user of the wireless terminal 101 performs an operation of selecting the group identifier. If the operation of selecting the group identifier is performed (YES in step S507), the wireless terminal 101 transmits a wireless authentication request, in which the selected group identification information is set, to the AP 1403, and performs an authentication sequence process 404 in step S508. When the AP 1403 receives this wireless authentication request (YES in step S605 of FIG. 6), the authentication sequence process 404 between the AP 1403 and the wireless terminal 101 is performed in step S606.

Subsequently, upon completion of the authentication sequence process 404 (YES in step S509), an association process 405 between the wireless terminal 101 and the AP 1403 is performed in step S510. Upon completion of this association process 405 (YES in step S607), the state of the wireless terminal 101 and the AP 1403 is changed to an in-communication state.

Similarly to the case of the wireless terminal 101, when the AP 1403 receives a probe request signal 406 from the wireless terminal 102 (YES in step S1701), the process proceeds to step S1702. In step S1702, the AP 1403 transmits a connection request message 1605, which includes the terminal identification information (the MAC address) of the wireless terminal 102, to the host PC 1401. Then, an entry-start-timer is started in step S1703.

Consequently, when the host PC 1401 receives the connection request message 1604 (YES in step S1801), the host PC 1401 checks the registered terminal information (for instance, the MAC address) stored in the storage area unit 1504 in step S1802. In a case where the terminal identification information of the wireless terminal 102 indicates that the wireless terminal 102 is an unregistered one (NO in step S1802), the host PC 1401 sets information representing the disapproval of access (for example, NG) in a connection response message 1606 in step S1806. Then, the host PC 1401 transmits the connection response message 1606 to the AP 1403 in step S1804.

Also, the host PC 1401 performs output 1607 of terminal identification information of the wireless terminal 102 to the input/output display 1402 through the external interface unit 1502 in step S1805 so as to display the terminal identification information of the wireless terminal 102 in the input/output display 1402. Consequently, the terminal identification information of the wireless terminal 102 is displayed in the input/output display 1402 as information representing a terminal, the access from which is not permitted.

On the other hand, the AP 1403 receives the connection response message 1606 (YES in step S1704), the AP 1403 checks the access permit "OK" or the disapproval "NG" included in the connection response message 1606 in step S1705. If an access is not permitted (NO in step S1705), the AP 1403 transmits a probe response message 407, in which the group identifier is unset, in a unicast form to the wireless terminal 102 in step S1707. That is, the probe response message 407, in which the length 314 included in the SSID information element 316 of the probe response frame 303 represents "0" and in which the group identifier (SSID=GHI789) is unset in the SSID region 315, is transmitted in a unicast form to the wireless terminal 102. Furthermore, if the connection response in step S1704 is not received, and if the timer does not expire in step S1706, the process returns to step S1704 to determine whether connection response is received. While if at step S1706 the time does expire, a probe response (except the SSID) is transmitted in step S1707 and then the process returns to step S1701.

Consequently, when the wireless terminal 102 receives the probe response message 407 (Yes in step S504), the wireless terminal 102 identifies the group identifier (SSID=UNSET) stored in the SSID region 315. Then, as shown in FIG. 16, the wireless terminal 102 performs the list display of the group identifier (SSID=??????). Consequently, the AP 1403 can be listed as an unconnectable access point. Therefore, because the AP 1403 cannot be connected, a user of the wireless terminal 102 cannot select the AP 1403.

Alternative Embodiment

Next, an alternative variant of the aforementioned third embodiment is described in detail below. The first modification is configured by applying a terminal information setting process to the system configuration of the third embodiment described with reference to FIG. 14.

Figure 19:
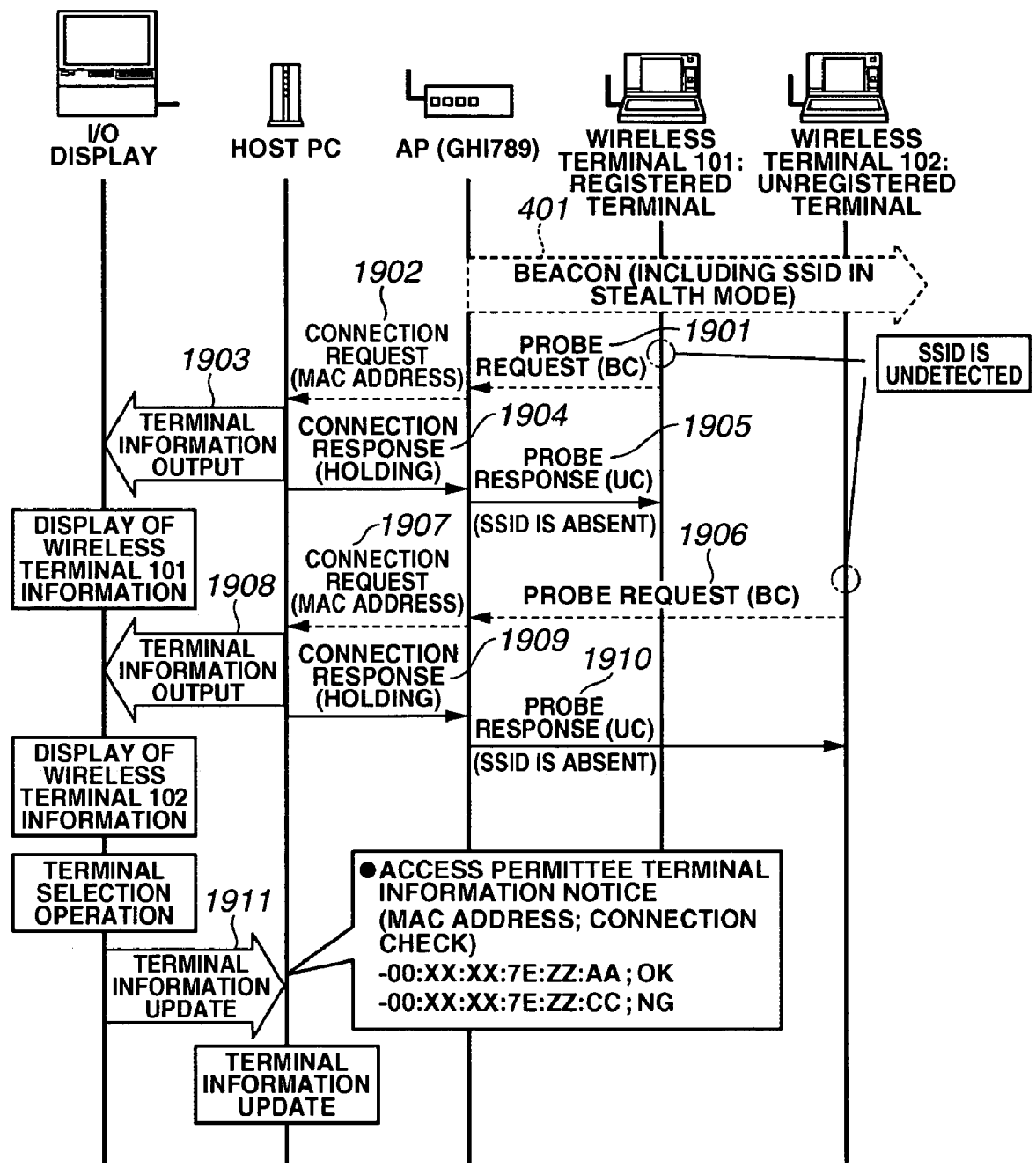
FIG. 19 is a sequence chart illustrating an exemplary terminal information setting process performed in a first modification of the third embodiment.

FIG. 19 is a sequence chart illustrating an exemplary terminal information setting process performed in the alternative embodiment. First, the AP 1403 is activated. The transmission of a beacon signal 401 is started. At that time, the SSID information element 312 stored in the field of the frame data 311 represented by the beacon signal 401 includes the field of the length 314, which represents "0". The field of the group identifier (SSID) 315 stores data representing "UNSET". Thus, the AP 1403 is in a state in which the "stealth function" is on.

Under this situation, in the beacon signal 401 detected by the wireless terminal 101, the group identifier (SSID) 315 is absent in the SSID information element 312 of the beacon frame 302. Therefore, the wireless terminal 101 transmits a probe request message 1901 in a broadcast form so as to inquire whether a wireless cell is present therearound, and so as to find an access point that can be connected and accepted. Also, a probe response timer is started.

When the AP 1403 receives the probe request message 1901 from the wireless terminal 101, the AP 1403 transmits a connection request message 1902, which includes the MAC address, that is, terminal identification information of the wireless terminal 101, to the host PC 1401. Then, an entry-start-timer is started.

Consequently, when the host PC 1401 receives the probe response messages 1902, the host PC 1401 checks the registered terminal information (for instance, the MAC address) stored in the storage area unit 1504. If the terminal identification information of the wireless terminal 101 indicates that the wireless terminal 101 is not a registered terminal, the host PC 1401 transmits a connection response message 1904, which includes information indicating the reservation of the access permit (for instance, RESERVATION), to the AP 1403.

The host PC 1401 performs output 1903 of terminal identification information of the wireless terminal 101 to the input/output display 1402 through the external interface unit 1502 so as to display the terminal identification information of the wireless terminal 101 in the input/output display 1402. Consequently, the terminal identification information (for instance, the MAC address) of the wireless terminal 101 is displayed in the input/output display 1402 as information representing a terminal that is performing an access request. Subsequently, the host PC 1401 stores terminal identification information (for example, the MAC address) unique to the wireless terminal 101 in a region, in which access terminal information is stored, in the storage area unit 1504.

Similarly to the case of the wireless terminal 101, when the AP 1403 receives a probe request message 1906 from the wireless terminal 102, the process proceeds to step S1702. The AP 1403 transmits a connection request message 1907, which includes the terminal identification information of the wireless terminal 102, to the host PC 1401. Then, an entry-start-timer is started.

Consequently, when the host PC 1401 receives the connection request message 1907, the host PC 1401 checks the registered terminal information (for instance, the MAC address) stored in the storage area unit 1504. If the terminal identification information of the wireless terminal 102 indicates that the wireless terminal 102 is an unregistered one, the host PC 1401 transmits a connection response message 1909, which includes information indicating the reservation of the access permit (for instance, RESERVATION), to the AP 1403.

Also, the host PC 1401 performs output 1908 of terminal identification information of the wireless terminal 102 to the input/output display 1402 through the external interface unit 1502 so as to display the terminal identification information of the wireless terminal 102 in the input/output display 1402. Consequently, the terminal identification information of the wireless terminal 102 is displayed in the input/output display 1402 as information representing a terminal that is performing an access request. Subsequently, the host PC 1401 stores terminal identification information (for example, the MAC address) unique to the wireless terminal 102 in a region, in which access terminal information is stored, in the storage area unit 1504.

On the other hand, the AP 1403 receives the connection response messages 1904 and 1909, the AP 1403 checks information representing "RESERVATION" included in the connection response messages 1904 and 1909. Then, the AP 1403 transmits probe response messages 1905 and 1910, in each of which the group identifier is unset. That is, the AP 1403 transmits the probe response messages 1905 and 1910, in each of which the length 314 included in the SSID information element 316 of the probe response frame 303 represents a value other than "0" and in which the group identifier (SSID=GHI789) is not set in the SSID region 315, is transmitted in a unicast form to the wireless terminals 101 and 102.

When the wireless terminals 101 and 102 receive the probe response messages 1905 and 1910, respectively, the wireless terminals 101 and 102 identify the group identifier (SSID=UNSET) stored in the SSID region 315. Then, each of the wireless terminals 101 and 102 performs the list display of the group identifier (SSID=??????) and lists the AP 1403 as an unconnectable access point. Therefore, because the AP 1403 cannot be connected, users of the wireless terminals 101 and 102 cannot select the AP 1403.

The terminal identification information (for example, the MAC address) relating to each of the probe request messages 1901 and 1906 respectively from the wireless terminals 101 and 102 is stored in the storage area unit 1504 of the host PC 1401 as the access terminal information. Further, the terminal identification information is displayed in the input/output display 1402. Also, the access terminal information differs from the registered terminal information (for instance, the MAC address) representing the registered terminal, the access from which is permitted, described in the description of the first embodiment.

Subsequently, a user selects the wireless terminal, the access from which is permitted to the wireless system, according to the terminal identification information (for example, the MAC address) displayed in the input/output display 1402 as a terminal represented by the access permittee terminal information. The input/output display 1402 transmits information representing a result of this selection (terminal information update information 1911) to the host PC 1401.

The host PC 1401, having received the terminal information update information 1911, causes the storage area unit 1504 to store the access permittee terminal information (for example, the MAC address) as the registered terminal information (for instance, the MAC address) representing the terminal, the permission of the access from which is determined.

Subsequently, as described in the description of the third embodiment, the host PC 1401 performs the connection control in the wireless communication system according to the registered terminal information, which is updated by the selection operation by a user, in response to an access request from the wireless terminal.

Second Alternative Variant

Next, a second alternative variant of the aforementioned third embodiment is described in detail below. The second alternative variant is configured so that a wireless terminal transmits a probe request message in a broadcast form without performing an operation of detecting a beacon signal.

Figure 20:
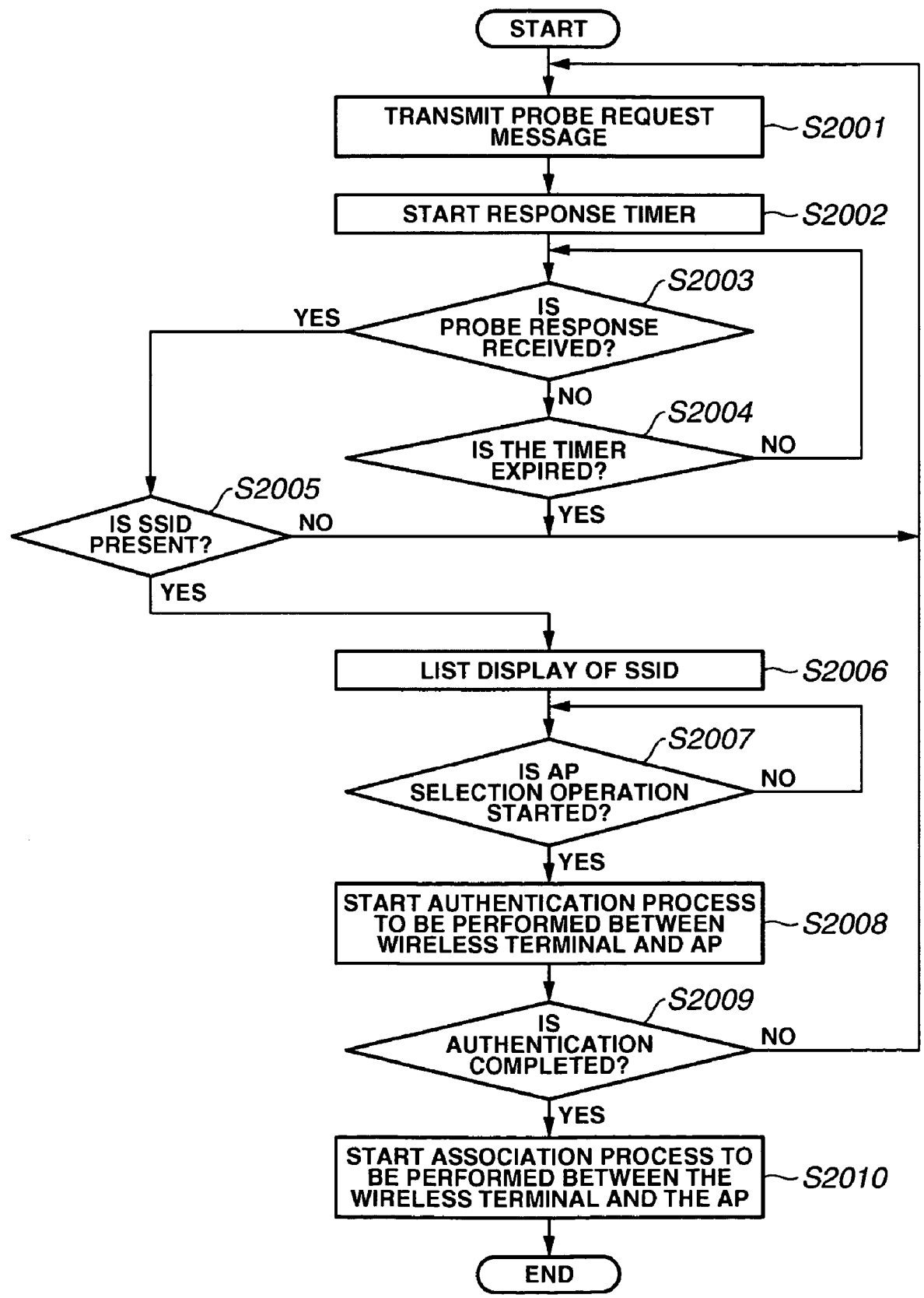
FIG. 20 is a flowchart illustrating exemplary processing performed at a wireless terminal in a second modification of the third embodiment.

FIG. 20 is a flowchart illustrating exemplary processing performed at a wireless terminal in the second alternative variant of the third embodiment. First, when the wireless terminal is activated, the wireless terminal transmits a probe request message in a broadcast form in step S2001. Then, a probe response timer is activated in step S2002.

Then, when the wireless terminal receives a probe response message (YES in step S2003), the wireless terminal identifies the group identifier (SSID=XXXXX) stored in the SSID region 315. As a result of identification, in a case were the group identifier is present (YES in step S2005), the list display of the group identifier (SSID=XXXXX) is performed. The wireless terminal lists an access point, which transmits the probe response message, as a connectable access point in step S2006.

On the other hand, if the group identifier is absent (NO in step S2005), the wireless terminal transmits a probe request message in a broadcast form in step S2001. Then, a probe response timer is activated in step S2002. Subsequently, the process performed in step S2001 to step S2004 is periodically repeated.

In a case where the wireless terminal cannot receive the probe response message (NO in step S2003), the wireless terminal checks in step S2004 whether the timer is expired. If the timer is not expired (NO in step S2004), the state of the wireless terminal is returned in step S2003 to a state in which the wireless terminal waits for a probe response message from the access point. Thereafter, when the timer is expired (YES in step S2004), the wireless terminal activates a probe response timer in step S2002, similarly to the case where the group identifier is absent. Subsequently, the wireless terminal periodically repeats the process performed in steps S2001 to S2004.

On the other hand, after the list display of the group identifier, the wireless terminal determines in step S2007 whether a user thereof performs an operation of selecting the group identifier. If the operation of selecting the group identifier is performed (YES in step S2007), the wireless terminal transmits a wireless authentication request, in which the selected group identifier is set, to the AP and performs an authentication sequence process in step S2008. When the AP receives this wireless authentication request, the authentication sequence process between the wireless terminal and the AP is performed.

Upon completion of this authentication sequence process (YES in step S2009), an association process between the wireless terminal and the AP is performed in step S2010. Upon completion of this association process, the state of the wireless terminal and the AP is changed to an in-communication state.

Third Alternative Embodiment

In the second embodiment, a user can output the connection request terminal information from the data output unit 812 to the printer 815. However, the connection request terminal information may be outputted not only to plain paper but to various kinds of storage media, such as CompactFlash memory (CF), detachably attached to an output unit using various kinds of media interfaces. In this case, the connection request terminal information output to the storage media may be corrected and is taken in the data input unit 811 from the scanner 814. Then, the taken data may be stored in the storage area unit 805 as the registered terminal information (for example, the MAC address).

Also, the system may be adapted so that each of the storage media, such as CF, is accessed at each wireless terminal connection request, without storing the registered terminal information (for instance, the MAC address) in the storage area unit 805.

In the foregoing description of the embodiments, the method of flexibly connecting the wireless terminal to the network, which is an example of a wireless LAN, has been described. However, the method of connecting the terminal to the network according to the present invention is not limited thereto. As long as the wireless communication system is configured so that the wireless terminal is connected to the network employing the method of determining the wireless access point, to which the wireless terminal is connected, by using the group identifier, any wireless communication system may be employed. That is, regardless of which analog and digital signals the signal to be processed is, the present invention can be applied to any system. Additionally, various modifications may be made without departing from the spirit and scope of the present invention.

According to the embodiments, the access point having the stealth function of hiding the group identifier (SSID) sends back a connection response message, which includes the group identifier (SSID), when receiving a connection request message from a wireless terminal that is preliminarily registered or permitted to access. Consequently, the step of preliminarily notifying a user, who operates a wireless terminal, of the group identifier (SSID) is omitted to thereby solve the problem of leakage of information. Thus, the security can be enhanced.

Also, the necessity for once canceling the stealth function by the administrator of the access point is eliminated. Thus, the connectable wireless terminal can appropriately select a desired access point from a list of access points, the connection to which is permitted (or access points that send back a response). Also, the need for the administrator and the users of the wireless terminals to perform troublesome operations is eliminated to thereby enhance the convenience of the system.

Thus, the present invention is expected to have advantages in that the depletion of system resources and reduction in the performance, which are caused by unnecessary accesses by terminals, which are not permitted to access, can be prevented, and that both of easy-access to the wireless communication system (that is, reduction in the users' effort of performing the connection to the network) and realization of high-level security can be satisfied.

Fourth Exemplary Embodiment

The configuration of a wireless communication system of a fourth embodiment of the present invention and that of an access point thereof are similar to those of the wireless communication system and the access point shown in FIGS. 1 and 2. Therefore, the description of the configurations of the system and the access point is omitted herein. The configurations of wireless terminals 2502, 2902, and 2903 in fifth and sixth embodiments of the present invention are similar to those shown in FIGS. 1 and 2. However, the wireless terminals 2502, 2902, and 2903 have various constituents (not shown), such as a scanner function unit and a printer function unit.

Figure 21:
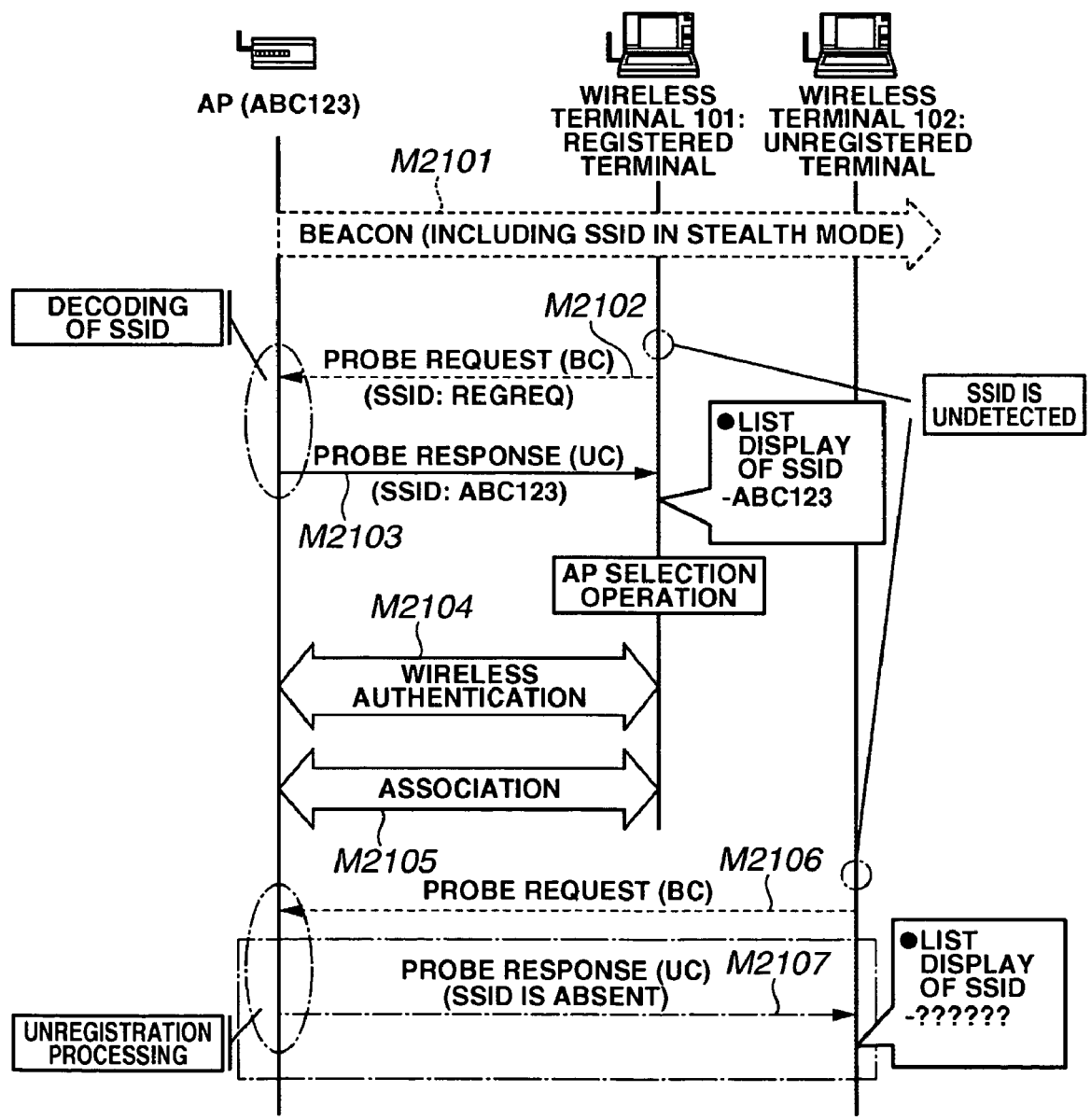
FIG. 21 is a sequence chart illustrating exemplary processing performed in a wireless communication system according to a fourth embodiment of the present invention.

FIG. 21 is a sequence chart illustrating exemplary processing performed in the wireless communication system according to the fourth embodiment of the present invention.

Figure 22:
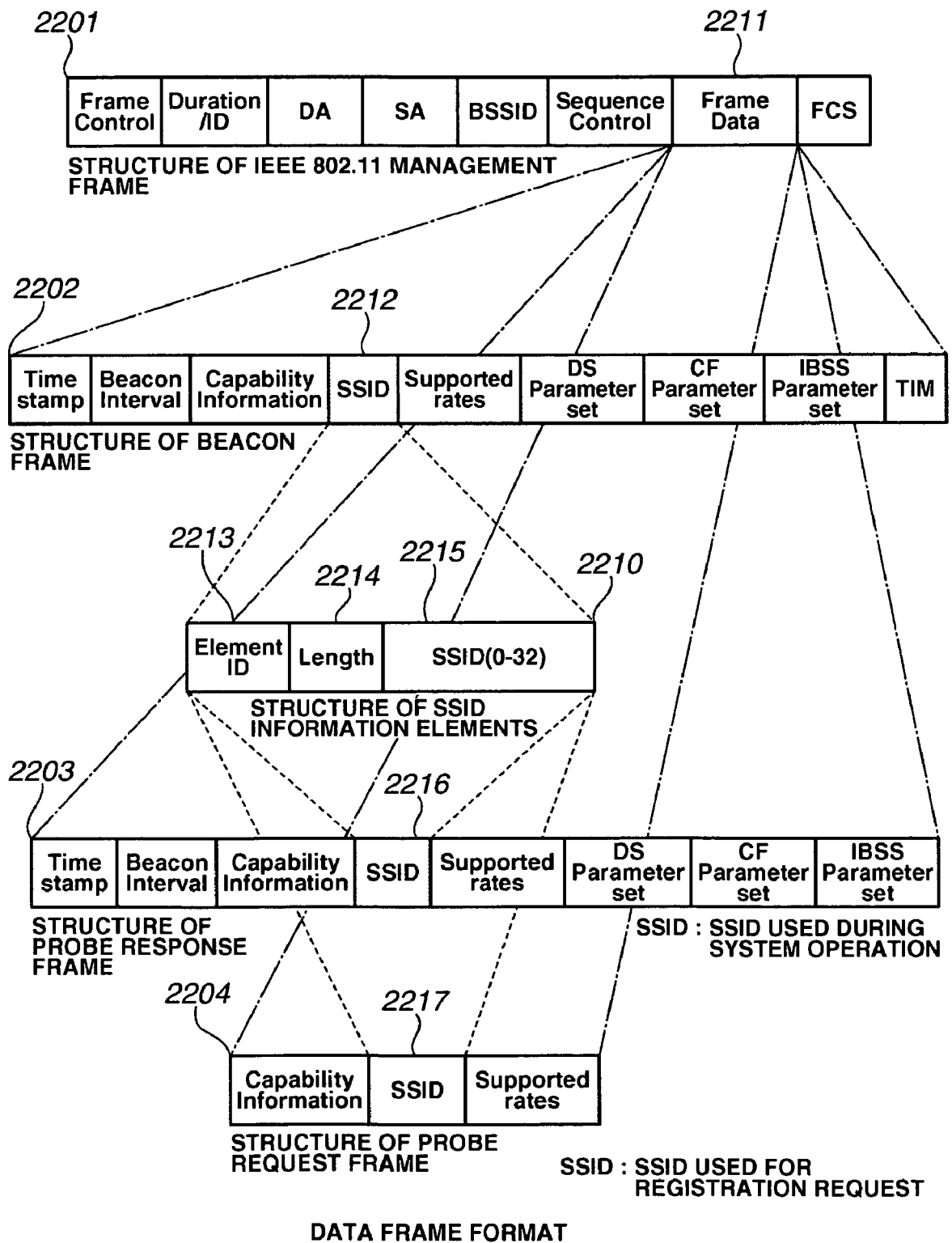
FIG. 22 is a diagram illustrating the data format of an IEEE802.11 MAC frame.

FIG. 22 is a diagram illustrating a data format 2201 of an IEEE802.11 MAC frame. In particular, FIG. 22 shows frame data 2211, a beacon frame format 2202, a probe response frame format 2203, and a probe request frame format 2204. An SSID 2212 has an SSID information element frame 2210 included in a beacon frame structure 2202. Especially, the SSID 2212 is an area for setting information on the group identifier. An element ID 2213 represents an information element identifier. The "length" 2214 represents the length of the SSID data set in the region of an SSID 2215, the maximum size of which is 32 bytes. An SSID 2216 indicates a frame 2210 of SSID information elements included in a probe response frame structure 2203. An SSID 2217 represents a frame 2210 of SSID information elements included in a probe request frame structure 2204.

Figure 23:
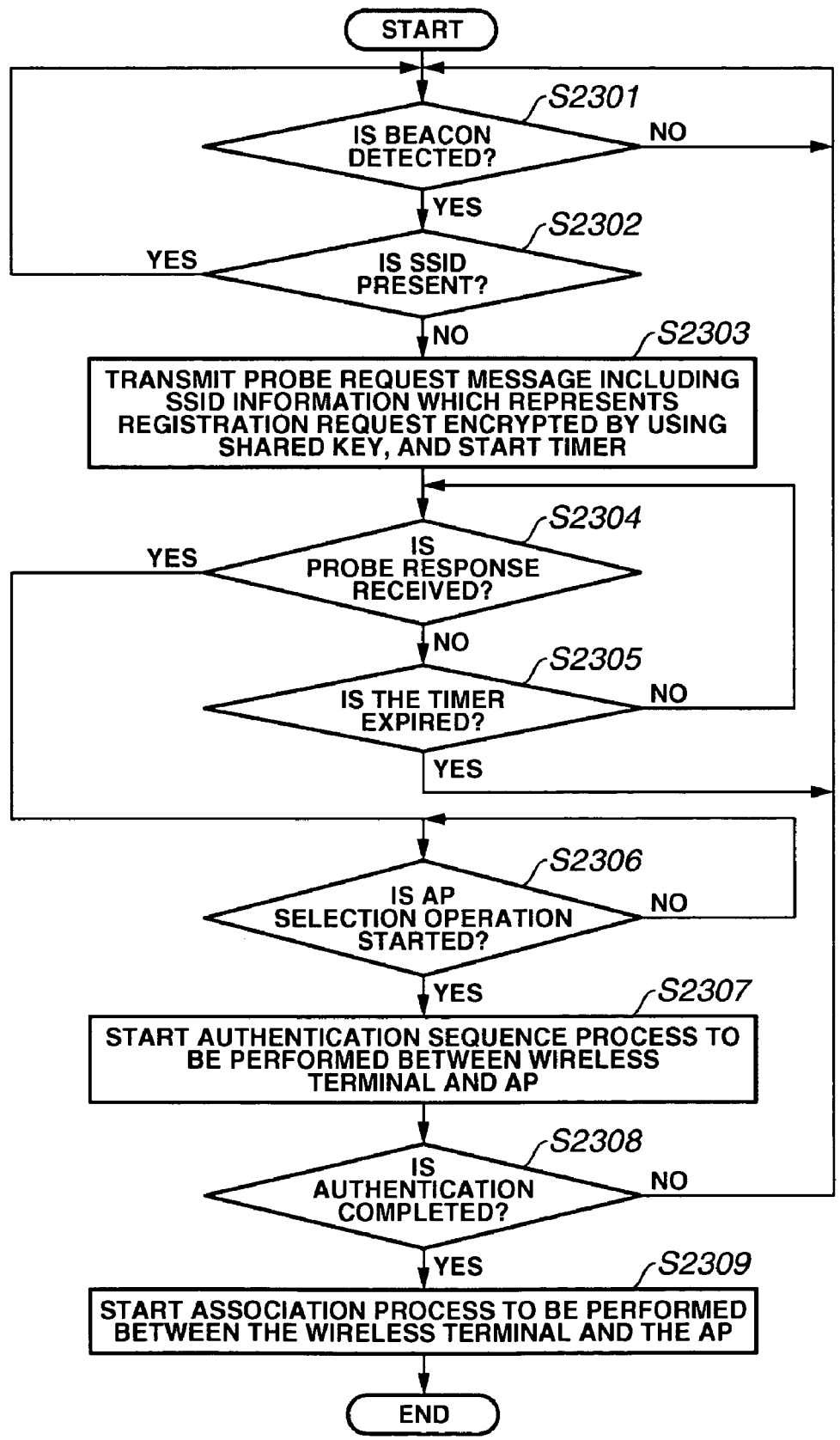
FIG. 23 is a flowchart illustrating exemplary processing performed at each of wireless terminals and of the fourth embodiment.
Figure 24:
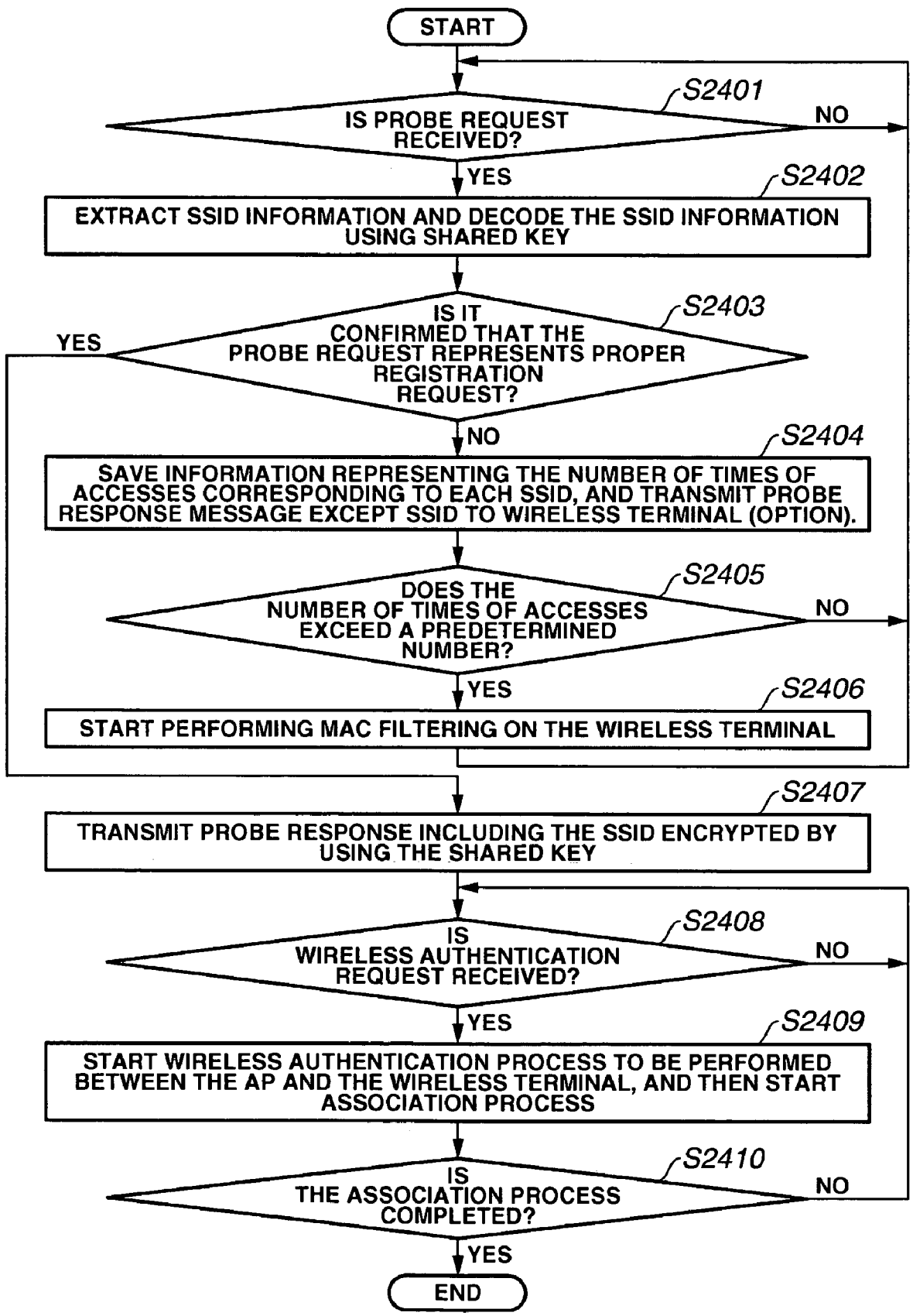
FIG. 24 is a flowchart illustrating exemplary processing performed at each of a wireless access point (AP) device and wireless terminals in the fourth to sixth embodiments.

FIG. 23 is a flowchart illustrating exemplary processing performed at each of the wireless terminals 101 and 102 of the fourth embodiment. While FIG. 24 is a flowchart illustrating exemplary processing performed at each of a wireless AP 103, and wireless terminals 2502, 2902, and 2903 in the fourth to sixth embodiments. Further, FIG. 25 is a diagram illustrating the configuration of a wireless communication system according to a fifth embodiment of the present invention.

Figure 25:
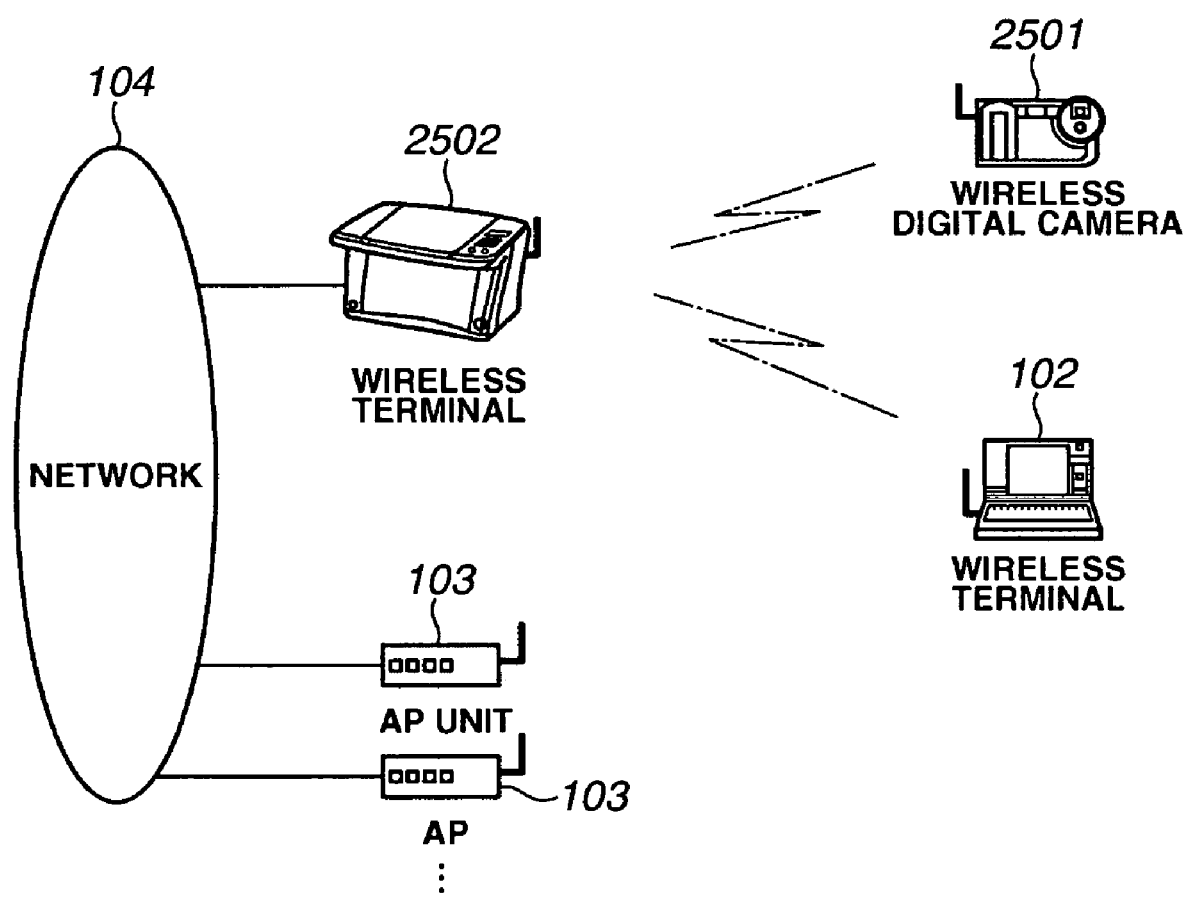
FIG. 25 is a diagram illustrating an exemplary configuration of a wireless communication system according to a fifth embodiment of the present invention.

In FIG. 25, reference numeral 2501 designates a digital camera capable of performing wireless communication, which is a wireless terminal incorporating the wireless function. A wireless terminal 2502, together with wireless terminals, such as a wireless terminal 2501 and a wireless terminal 102, constitute an ad hoc network, the group identifier of which is "ABC123". The wireless terminal 2502 serving as an IBSS creator notifies the network area of beacon frame information inherent in the ad hoc network.

Figure 26:
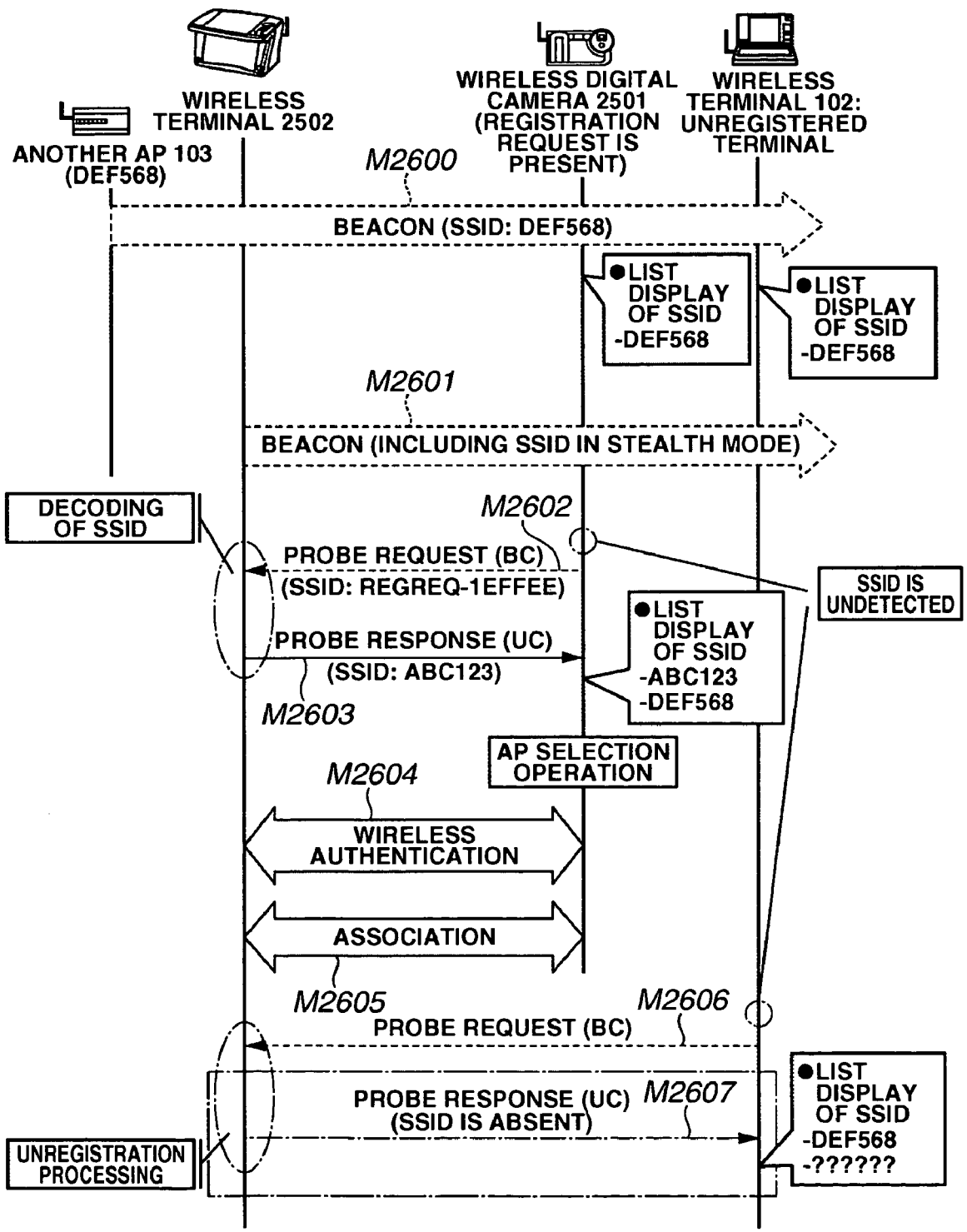
FIG. 26 is a sequence chart illustrating an exemplary processing performed in the fifth embodiment.
Figure 27:
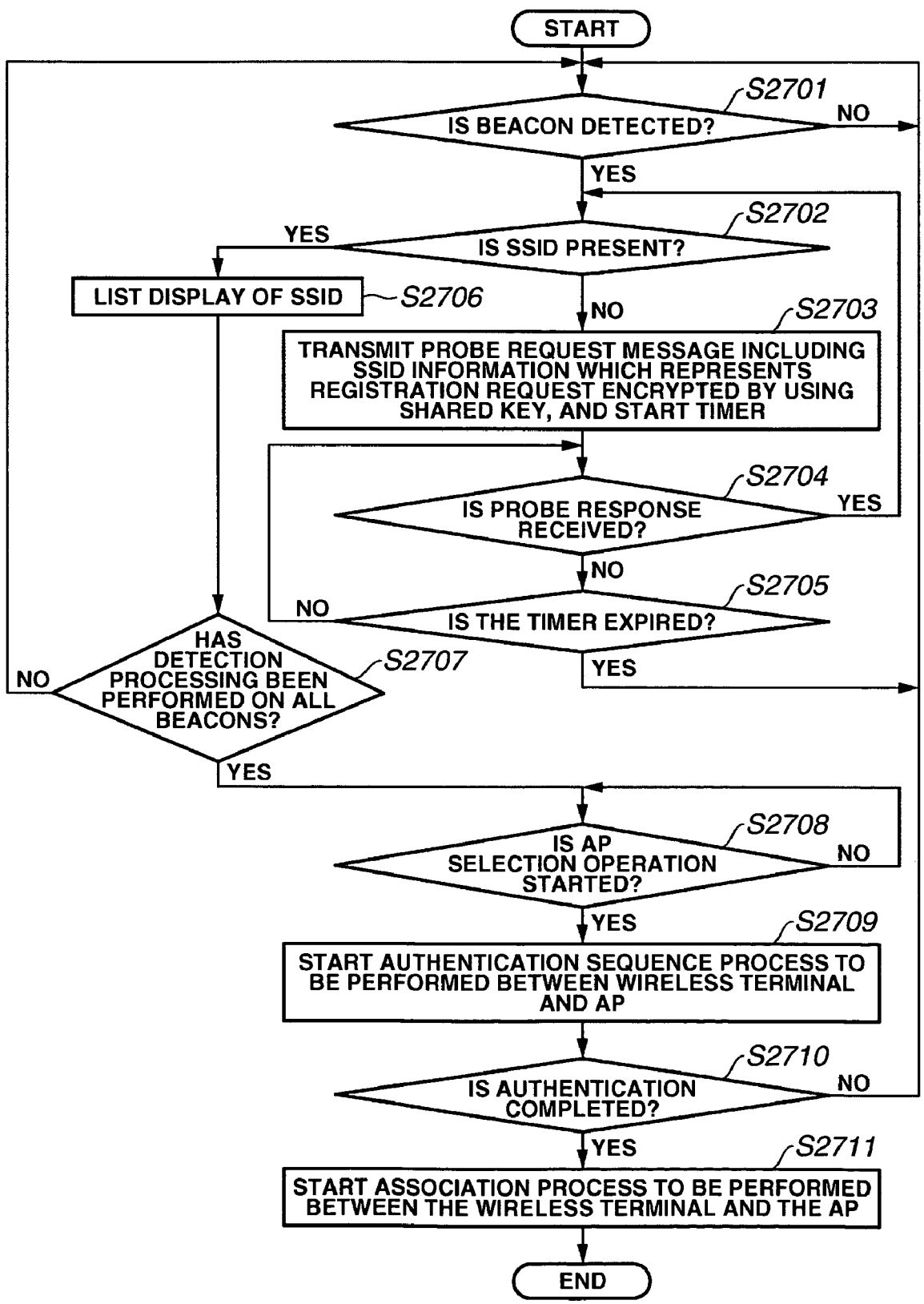
FIG. 27 is a flowchart illustrating exemplary processing performed in the wireless terminals in the fifth embodiment.
Figures 28, 29:
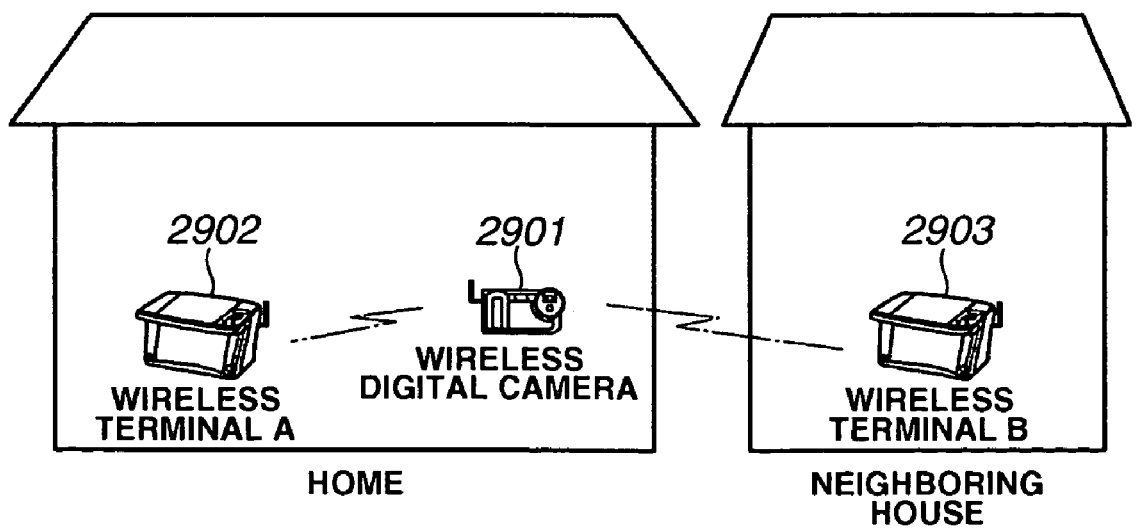
FIG. 28 is a table illustrating exemplary terminal access information stored in a storage area unit of each of the AP, and the wireless terminals in the fourth to sixth embodiments.
FIG. 29 is a diagram illustrating an exemplary configuration of a wireless communication system of the sixth embodiment of the present invention.

FIG. 26 is a sequence chart illustrating exemplary processing performed in the wireless communication system according to the fifth embodiment. While FIG. 27 is a flowchart illustrating processing performed in each of the wireless terminals 2501 and 102 in the fifth embodiment. FIG. 28 is a table illustrating exemplary terminal access information stored in the storage area unit 205 of each of the AP 103, and the wireless terminals 2502, 2902, and 2903 in the fourth to sixth embodiments.

FIG. 29 is a diagram illustrating the configuration of a wireless communication system according to a sixth embodiment of the present invention. In FIG. 29, reference numeral 2901 denotes a wireless terminal incorporating a wireless function, which is a digital camera capable of performing wireless communication.

A wireless terminal A 2902 is used in the same wireless area as that in which the wireless terminal 2901 is used. The network can be constituted in each of an ad hoc mode and an infrastructure mode. A wireless terminal B 2903 is activated in a wireless area in which the wireless digital camera 2901 and the wireless terminal A 2902 are used. The wireless terminal B 2903 has functions equivalent to those of the wireless terminal A 2902.

Figure 30:
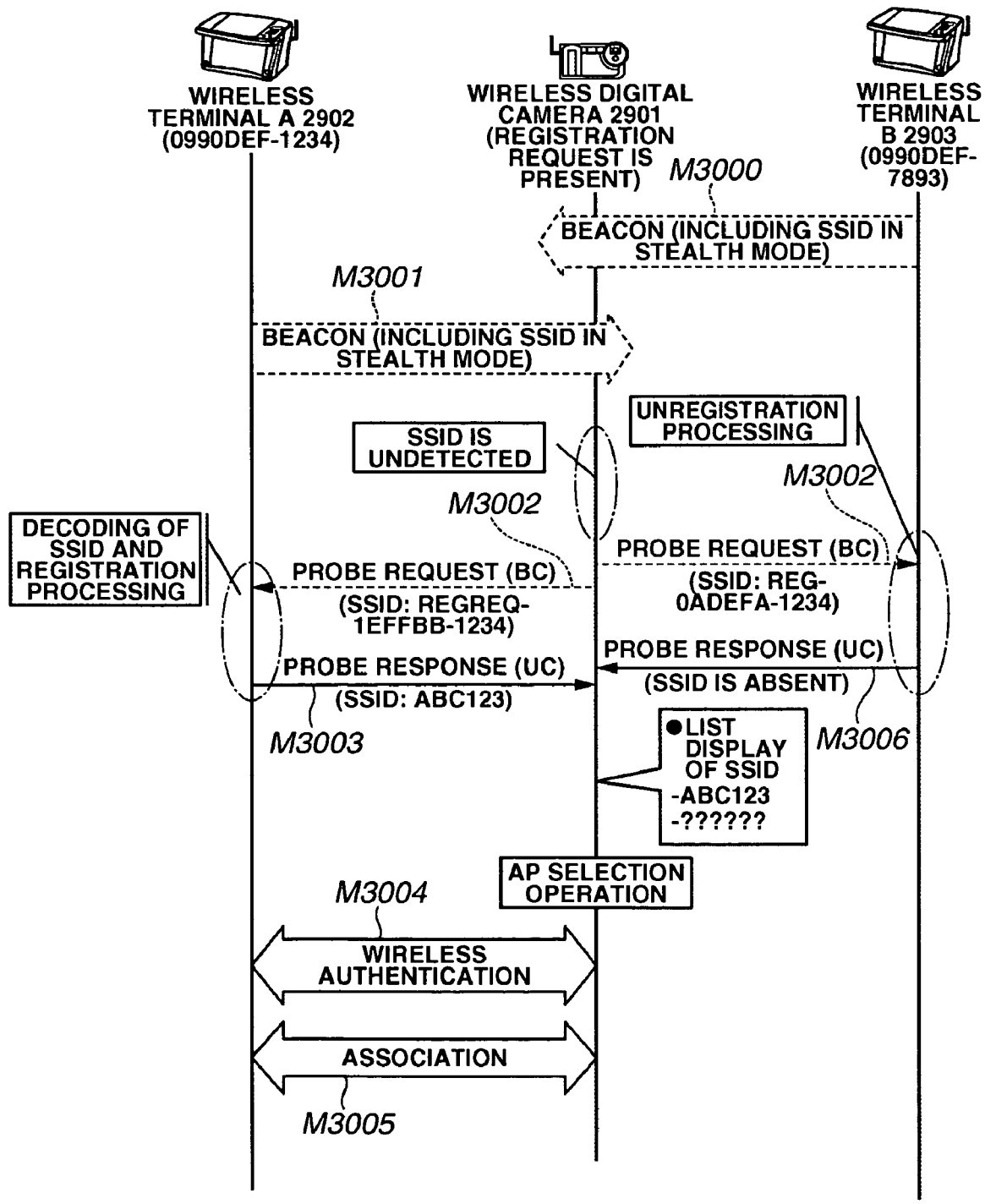
FIG. 30 is a sequence chart illustrating exemplary processing in the wireless communication system of the sixth embodiment.

FIG. 30 is a sequence chart illustrating exemplary processing in the wireless communication system according to the sixth embodiment.

Hereinafter, the wireless communication system according to the fourth embodiment of the present invention is described below by referring to FIGS. 21 to 24 and FIG. 28.

As illustrated in the sequence chart illustrating the processing performed in the wireless communication system shown in FIG. 21, the AP 103 is activated. Then, the transmission of a beacon signal M2101 is started. At that time, the SSID information element in the field of the frame data represented by the beacon signal M2101 includes the length 2214 that represents "0." The data set in the field of the group identifier (SSID) 2215 represents "UNSET." Thus, the AP 103 is in a state in which the "stealth function" is on.

Under this situation, when the wireless terminal 101 detects the beacon signal M2101 (YES in step S2301; See FIG. 23), the wireless terminal 101 identifies the group identifier included in data represented by the beacon signal M2101 in step S2302. In a case where the group identifier (SSID) 2215 is absent (NO in step S2302), the process proceeds to step S2303. In step S2303, the wireless terminal 101 broadcasts a probe request message M2102 so as to inquire whether a wireless cell is present therearound, to find an AP that can be connected and accepted, and to register the wireless terminal 101 itself.

The probe request message M2102 contains an encrypted specific character string (SSID="REGREQ") indicating a registration request, which is preliminarily determined between the wireless terminal 101 and the AP 103. More particularly, the specific character string representing the registration request is coded into a group identifier (SSID) 2215. Then, the group identifier (SSID) 2215 together with the length 2214 thereof is encrypted with a shared key used for the AP 103 and is contained in the probe request message M2102 as an SSID information element 2217. Subsequently, the wireless terminal 1091 transmits the probe request message M2102. Then, a probe response timer is started in step S2303.

When the AP 103 receives the probe request message M2102 in step S2401 (see FIG. 24), the group identifier (SSID) 2215 included in the SSID information element 2217 of this message and the length 2214 are decoded by using a secret key in step S2402. If it is confirmed (YES in step S2403) that the decoded group identifier (SSID) 2215 is a special character string (for example, "REGREQ"), which is stored in the storage area unit 205 and which means a registration request, the process proceeds to step S2407.

Then, the value designated by the field of the data length 2214 included in the SSID information element frame 2210 of the SSID information element 2216 is set to be a predetermined value other than "0." Predetermined SSID information (SSID="ABC123") is set in the area of the group identifier information 2215. Further, the AP 103 transmits a probe response message M2103 including the SSID information element 2216 obtained by encrypting the length 2214 and the group identifier (SSID=ABC123) information 2215 with a shared key in a unicast form to the wireless terminal 101 in step S2407. Subsequently, a terminal access table stored in the storage area unit 205 is referred to according to the terminal identification information (the MAC address or the like) of the wireless terminal 101. The number of times of accesses 2802 corresponding to the associated terminal identification information is updated. Information representing "OK" is set in the connection check 2803.

The wireless terminal 101, having received the probe response message M2103 (YES in step S2304), identifies the group identifier (SSID=ABC123) 2215. Then, the list display of the group identifier (SSID=ABC123) 2215 is performed. That is, the AP 103 is listed as a connectable wireless access point device.

In a case where the wireless terminal 101 cannot receive the probe response message M2103 (NO in step S2304), the wireless terminal 101 checks whether the timer is expired. If the timer is not expired (NO in step S2305), the state of the wireless terminal 101 is changed in step S2304 to a state in which the wireless terminal 101 waits for the probe response message M2103 from the AP 103. Thereafter, when the timer is expired (YES in step S2305), the state of the wireless terminal 101 is changed in step S2301 to a state in which the wireless terminal 101 detects a new beacon signal.

After the list display of the group identifier is performed, if the operation of selecting the group identifier is performed by a user (YES in step S2306) to thereby select the connection to the AP 103, the wireless terminal 101 transmits a wireless authentication request to the AP 103. Then, the wireless terminal 101 performs an authentication sequence process M2104 in step S2307. When the AP 103 receives this wireless authentication request (YES in step S2408), the authentication sequence process M2104 is performed between the AP 103 and the wireless terminal 101. Subsequently, an association process M2105 is performed in step S2409.

Upon completion of the authentication sequence process M2104 (YES in step S2308), the association process M2105 between the wireless terminal 101 and the AP 103 is performed in step S2309. Upon completion of the association process M2105 (YES in step S2410), the state of the AP 103 and the wireless terminal 101 is changed to an in-communication state.

When the AP 103 receives a probe request message M2106 from the wireless terminal 102 (YES in step S2401), the process proceeds to step S2402. In step S2402, the AP 103 detects the group identifier (SSID) 2215 stored in the SSID information element 417 included in the probe request message M2106 and the length 2214 stored therein. The AP 103 also decodes the group identifier (SSID) 2215 and the length 2214 by using a shared key. Then, the AP 103 determines in step S2403 whether the decoded group identifier (SSID) 2215 is a special character string (for example, "REGREQ"), which is stored in the storage area unit 205 and which means a registration request. If it is not confirmed that the decoded group identifier (SSID) 2215 is the special character string (NO in step S2403), the AP 103 refers to the terminal access information table stored in the storage area unit 205 according to the terminal identification information (the MAC address or the like) 2801 of the wireless terminal 102 and updates the number of times of accesses 2802. Also, the AP 103 sets data representing "NG" in the connection check 2803. Further, the AP 103 transmits a probe response message M2107, in which the field of the length 2214 included in the SSID information element frame 2210 of the SSID 2216 represents "0" and in which the group identifier is unset in the SSID region 2215, in a unicast form to the wireless terminal 102 in step S2404.

When receiving the probe response message M2107, the wireless terminal 102 checks the group identification information 2215. If the group identifier is absent, the wireless terminal 102 performs the list display of the group identification information 2215. In this case, the group identifier represented by the group identification information 2215 is unset. Thus, as shown in FIG. 21, the list display of "??????" is performed. Therefore, because the AP 103 cannot be connected to the wireless terminal 102, a user cannot select the AP 103.

After transmitting the probe response message M2107 to the wireless terminal 102, the AP 103 checks the number of times of accesses 2802 from the wireless terminal 102 in step S2405. Consequently, in a case where the number of times of accesses 2802 does not exceed a predetermined number of times (for example, 16) (NO in step S2405), the state of the AP 103 is changed in step S2401 to a state in which the AP 103 is ready for receiving a probe request message from a wireless terminal.

Conversely, if the number of times of accesses 2802 exceeds the predetermined number of times (YES in step S2405), the AP 103 refers to the terminal access information table stored in the storage area unit 205. Then, the AP 103 stores the terminal identification information (the MAC address or the like) 2801 of the wireless terminal 101 in a MAC address filter. Subsequently, the AP 103 performs the terminal access control process using the MAC address in step S2406.

Fifth Exemplary Embodiment

Hereinafter, the wireless communication system according to the fifth embodiment of the present invention is described by referring to FIGS. 24 to 28.

As shown in FIG. 26, a plurality of APs 103 are activated in the area. The APs 103 notify beacon signals M2600 simultaneously with the activation. In the beacon signal M2600, the data length 2214 included in the SSID information element frame 2204 corresponding to the SSID 2212 of the data frame is set to a value other than "0." Also, the predetermined SSID information (SSID=DEF568) is set as the group identifier in the region for the information 2215. That is, the AP 103 is in a state in which the "stealth function" is off.

At that time, the wireless terminal 102 and the wireless terminal (digital camera) 2501 detect beacon signals M2600 from the plurality of APs 103 (YES in step S2701). Then, the wireless terminal determines in step S2702 whether the group identifier (SSID) 2215 is present. In a case where the group identifier (SSID) 2215 is present (YES in step S2702), the plurality of APs 103 are listed and displayed in step S2706 as wireless access points that can be connected and selected. Subsequently, the wireless terminal searches the area for other APs notifying beacon signals M2600 (see FIG. 26) in each of which the group identifier (SSID) 2215 is present. In a case where another beacon signal M2600 including SSID information is detected as described above (NO in step S2707), an operation of checking the SSID information in the beacon signal is repeated in steps S2701, S2702, S2706, and S2707.

Under this situation, the wireless terminal 2502, which differs from the AP 103 and serves as an IBSS creator, determines a beacon interval and establishes synchronization with a plurality of wireless terminals to transmit and receive data to and from the plurality of wireless terminals. A certain time period starting from the commencement of this beacon interval, that is, a moment at which a beacon signal is transmitted, is referred to as an "ATIM window." The IBSS preliminarily notifies transmission of the data using an ATIM frame to transmit a data frame to a terminal put into a PS (power save) mode. An ATIM is transmitted in a special time period referred to as the "ATIM window." In this time period referred to as the "ATIM window", only the transmission of a beacon signal or an ATIM is permitted. The wireless digital camera 2501 in the PS mode is in an awake state in which data can be transmitted and received.

At that time, the wireless terminal 2502 serving as the IBSS creator is in a state in which this terminal is transmitting a beacon signal M2601. The SSID information element 2212 stored in the field of the frame data 2211 of the beacon signal M2601 includes the field of the data length 2214, which represents "0." Also, the field of the group identifier (SSID) 2215 stores data representing "UNSET". Thus, the wireless terminal 2502 is in a state in which the "stealth function" is on. Then, the wireless terminal 2501 detects the beacon signal SSID 2601 (YES in step S2701). In a case where the group identifier (SSID) 2215 is absent (NO in step S2702), the process proceeds to step S2703.

In step S2703, the wireless terminal 2501 broadcasts a probe request message M2602 so as to inquire whether a wireless cell is present therearound, to find an AP or a wireless terminal that can be connected to and can accept the wireless terminal 2501, and to register the wireless terminal 2501 itself. The probe request message M2602 contains the encrypted special character string ("REGREQ") indicating a registration request, which is preliminarily determined between the wireless terminals 2501 and 2502, and the encrypted terminal identification information ("1E-FF-EE" (the lowest three bytes of the MAC address, or the like)) of the wireless terminal 2501. More particularly, the special character string indicating a registration request and the terminal identification information of the wireless terminal 2501 are encoded into the group identifier (for example, SSID="REGREQ 1E-FF-EE") 2215. Then, the group identifier 2215 and the length 2214 are encrypted using a public key corresponding to a secret key that the wireless terminal 2502 possesses. Further, resultant data of the encryption is contained in the message M2602 as the SSID information element 2217. Subsequently, the wireless terminal 2501, after broadcasting the probe request message M2602, activates the probe response timer in step S2703.

When the wireless terminal 2502 receives the probe request message M2602 (YES in step S2401), the process proceeds to step S2402. In step S2402, both of the group identifier (SSID) 2215 and the length 2214 contained in the SSID information element 2217 in the probe request message M2602 are decoded by using the secret key in step S2402.

Then, the wireless terminal 2502 checks whether the decoded group identifier (SSID) 2215 is the special character string (for example, "REGREQ") representing a registration request, which is stored in the storage area unit 205. If it is confirmed that the decoded group identifier (SSID) 2215 is the special character string representing a registration request, the associated terminal identification information ("1E-FF-EE" (the lowest three bytes of the MAC address, or the like)) of the wireless terminal 2501 is compared with the MAC address stored in the management frame 2201.

If matched, the wireless terminal 2502 determines in step S2403 that this message is the probe request message M2602 representing a proper registration request from the wireless terminal 2501. In step S2407, the data length 2214 included in the SSID information element frame 2210, which is the SSID information element 2216, is set to a predetermined value other than "0", and predetermined SSID information (SSID="ABC123") is set in the region of the group identifier information 2215. Then, the wireless terminal 2502 transmits a probe response message M2603 containing an SSID information element 2216 obtained by encrypting the length 2214 and the group identifier information (SSID="ABC123") 2215 using the shared key in a unicast form to the wireless terminal 2501.

Subsequently, the wireless terminal 2502 refers to the terminal access information table stored in the storage area unit 205 and updates the number of times of accesses 2802 according to the terminal identification information (the MAC address or the like) 2801 of the wireless terminal 2501. Also, data representing "OK" is set in the connection check 2803.

The wireless terminal 2501, having received the probe response message M2603 (YES in step S2704), checks the group identifier (SSID=ABC123) 2215 in step S2702. Then, the wireless terminal 2501 performs the list display of the group identifier (SSID=ABC123) 2215 corresponding to the wireless terminal 2502 in a form differing from the form used in the wireless access point 103 (see FIG. 26).

In this case, the group identifier (SSID=ABC123) is displayed in a form differing from the form used to display the SSID information (SSID=DEF568) corresponding to the wireless access point 103 detected by performing an operation of checking the SSID information included in the beacon signal in steps S2701, S2702, and S2707. That is, the wireless terminal 2502 is listed as a connectable wireless terminal in step S2706. The operation of checking the SSID information included in the beacon signal is performed in steps S2701, S2702, S2706, and S2707 until a detection operation of detecting the beacon signal is performed on all beacon signals in the area.

On the other hand, in a case where the detection operation on all of the beacon signals in the area is completed (YES in step S2707), the state of the wireless terminal 2501 is changed to a state in which the terminal 2501 waits for a user's operations of connecting and selecting a terminal.

Conversely, in a case where the wireless terminal 2501 cannot receive the probe response message M2603 (NO in step S2704), the wireless terminal 2501 checks in step S2705 whether the timer is expired. If the timer is not expired (NO in step S2705), the state of the wireless terminal 2501 is changed to a state in which the terminal 2501 waits for receiving the probe response message M2603 from the wireless terminal 2502 (step S2704). If the timer is expired (YES in step S2705), the state of the wireless terminal 2501 is changed in step S2701 to a state in which the wireless terminal 2501 detects a new beacon signal.

If a user selects the connection of the wireless terminal 2501, which has performed the list display of the group identifier, to the wireless terminal 2502 in step S2708, the wireless terminal 2501 transmits a wireless authentication request to the wireless terminal 2502, and performs an authentication sequence process M2604 in step S2709. The wireless terminal 2502, having received the wireless authentication request (YES in step S2408), performs the authentication sequence process M2604 together with the wireless terminal 2501 and subsequently starts an association process M2605 in step S2409.

Upon completion of the authentication sequence process M2604 (YES in step S2710), the association process M2605 between the wireless terminals 2501 and 2502 is performed in step S2711. Upon completion of the association process M2605 (YES in step S2410), the state of the wireless terminals 2501 and 2502 is changed to an in-communication state.

When the wireless terminal 2502 receives a probe request signal M2606 from the wireless terminal 102 (YES in step S2401), the process proceeds to step S2402. In step S2402, the wireless terminal 2502 detects the group identifier (SSID) 2215 stored in the SSID information element 2217 included in the probe request message M2606 and the length 2214 stored therein. The wireless terminal 2502 also decodes the group identifier (SSID) 2215 and the length 2214 in step S2402 by using a shared key. Then, the wireless terminal 2502 determines in step S2403 whether the decoded group identifier (SSID) 2215 is a special character string (for example, "REGREQ"), which is stored in the storage area unit 205 and which represents a registration request.

In a case where it is not confirmed that the decoded group identifier (SSID) 2215 is the special character string (NO in step S2403), or that there is the possibility of spoofing due to the wrong terminal identification information (NO in step S2403), the process proceeds to step S2404. In step S2404, the wireless terminal 2502 refers to the terminal access information table stored in the storage area unit 205 according to the terminal identification information (the MAC address or the like) 2801 of the wireless terminal 102 and updates the number of times of accesses 2802. Also, the wireless terminal 2502 sets data representing "NG" in the connection check 2803. Then, the wireless terminal 2502 transmits a probe response message M2607, in which the field of the length 2214 included in the SSID information element frame 2210 of the SSID 2216 represents "0" and in which the group identifier is unset in the SSID region 2215, in a unicast form to the wireless terminal 102 in step S2404.

When receiving the probe response message M2607, the wireless terminal 102 checks the group identifier (SSID) 2215. If the group identifier is absent, the wireless terminal 102 performs the list display of the group identifier information 2215. In this case, the group identifier represented by the group identifier information 2215 is unset. Thus, as shown in FIG. 26, the list display of "??????" is performed. Therefore, because the wireless terminal 2502 cannot be connected to the wireless terminal 102, a user cannot select the wireless terminal 2502.

After transmitting the probe response message M2607 to the wireless terminal 102, the wireless terminal 2502 checks the number of times of accesses 2802 from the wireless terminal 102 in step S2405. Consequently, in a case where the number of times of accesses 2802 does not exceed a predetermined number of times (for example, 16) (NO in step S2405), the state of the wireless terminal 2502 is changed in step S2401 to a state in which the wireless terminal 2502 is ready for receiving a probe request message from a wireless terminal.

Conversely, if the number of times of accesses 2802 exceeds the predetermined number of times (YES in step S2405), the wireless terminal 2502 refers to the terminal access information table stored in the storage area unit 205. Then, the terminal identification information (the MAC address or the like) 2801 of the wireless terminal 102 is registered in a MAC address filter. Subsequently, the wireless terminal 2502 performs the terminal access control process using the MAC address in step S2406.

Sixth Exemplary Embodiment

Hereinafter, a wireless communication system according to the sixth embodiment of the present invention is described by referring to FIGS. 28 to 30 as well as FIG. 24. As shown in FIG. 29, a wireless terminal A 2902 is activated in a home in the coverage area of a wireless terminal 2901. Also, in a neighboring house, a wireless terminal B 2903, whose function is equivalent to that of the wireless terminal A 2902, is activated. These wireless terminals 2902 and 2903 transmit beacon signals M3000 and M3001 simultaneously with the activation thereof (see FIG. 30).

Each of these beacon signals M3000 and M3001 has a data frame including the SSID 2212 that is the SSID information element frame 2204 having the data length 2214 representing "0" and also having the group identifier (SSID) 2215 in which data is unset. Thus, the wireless terminals 2902 and 2903 are in a state in which the "stealth function" is on. Under this situation, when the wireless terminal 2901 is to be registered in the wireless terminal A 2902 placed in the same home, the last four digits (1234) of the manufacturer's serial number of the wireless terminal 2901 are registered in the wireless terminal 2901.

In a case where the wireless terminal 2901 detects one of the beacon signals M3000 and M3001, the wireless terminal 2901 confirms the presence of the group identifier (SSID) 2215. In a case where the group identifier (SSID) 2215 is absent, the wireless terminal 2901 broadcasts a probe request message M3002 to the wireless terminal A 2902 to register the wireless terminal 2901 in the wireless terminal A 2902. This probe request message M3002 contains a special character string, which is preliminarily determined between the wireless terminal A 2902 and the wireless terminal 2901 to represent a registration request, and also contains the terminal identification information of the wireless terminal 2901, and the preliminarily registered last four digits of the manufacturer's serial number of the wireless terminal A 2902. The special character string, the terminal identification information of the wireless terminal 2901, and the last four digits of the manufacturer's serial number of the wireless terminal A 2902 are encrypted. More particularly, the character string, the terminal identification information, and the last four digits of the manufacturer's serial number are set to be "REGREQ", "1E-FF-BB" (the last three bytes of the MAC address), and "1234", respectively. These pieces of information are coded into the group identifier (for example, SSID="REGREQ 1E-FF-BB-1234") 2215. The group identifier (SSID) 2215 and the length 2214 are encrypted by using a public key associated with a secret key that the wireless terminal A 2902 possesses. This encrypted data is contained in the SSID information element 2217. Then, the wireless timer 2901 activates a probe response timer.

When the wireless terminal A 2902 receives the probe request message M3002 in step S2401, the process proceeds to step S2402. In step S2402, both of the group identifier (SSID) 2215 and the length 2214 contained in the SSID information element 2217 in the probe request message M3002 are decoded by using the secret key.

Subsequently, the wireless terminal A 2901 determines whether the decoded group identifier (SSID) 2215 is the special character string (for instance, "REGREQ"), which is stored in the storage area unit 205 and designates a registration request. If it is confirmed that the decoded group identifier (SSID) 2215 is the special character string indicating a registration request, the wireless terminal A 2902 compares the terminal identification information ("1E-FF-BB" (the lowest three bytes of the MAC address, or the like)) of the associated wireless terminal 2501 with the MAC address stored in the management frame 2201. If matched, the wireless terminal A 2902 compares the associated four digits with the last four digits of the manufacturer's serial number of the wireless terminal A 2902, and determines whether the associated four digits are matched with the last four digits of the manufacturer's serial number. If matched, the wireless terminal A 2902 determines in step S2403 that this message is a probe request message M3002 indicating a proper registration request from the wireless terminal 2901 to the wireless terminal A 2902. Further, the wireless terminal A 2902 sets the value designated by the field of the data length 2214 included in the SSID information element frame 2210 of the SSID information element 2216 to be a predetermined value other than "0", and also sets predetermined SSID information (SSID="ABC123") in the area of the group identifier information 2215. Then, the wireless terminal A 2902 transmits a probe response message M3003 including the SSID information element 2216 obtained by encrypting the length 2214 and the group identifier (SSID=ABC123) information 2215 with a shared key in a unicast form to the wireless terminal 2901 in step S2407.

Subsequently, a terminal access table stored in the storage area unit 205 is referred to according to the terminal identification information (the MAC address or the like) 2801 of the wireless terminal 2901. The number of times of accesses 2802 corresponding to the associated terminal identification information is updated. Also, information representing "OK" is set in the connection check 2803. The wireless terminal 2901, having received the probe response message M3003, identifies the group identifier (SSID=ABC123) 2215. Then, the list display of the group identifier (SSID=ABC123) 2215 corresponding to the wireless terminal A 2902 is performed. That is, the wireless terminal A 2902 is listed as a connectable wireless terminal.

In a case where it is not confirmed that the received probe request message M3002 contains the special character string, the wireless terminal A 2902 determines that the received message is a probe request message M3002 indicating an improper registration request. Then, the wireless terminal A 2902 performs the process to be performed in step S2404 and later. Further, even in a case where the terminal identification information of the wireless terminal 2901 is not matched with the MAC address stored in the management frame 2201, or where the associated four digits are not matched with the last four digits of the manufacturer's serial number of the wireless terminal A 2902, the wireless terminal A 2902 performs the process to be performed in step S2404 and later.

If a user performs a selecting operation in the wireless terminal 2901 to thereby select the connection of the wireless terminal 2901 to the wireless terminal A 2902, the wireless terminal 2901 transmits a wireless authentication request to the wireless terminal A 2902, and performs an authentication sequence process M3004. The wireless terminal A 2902, having received the wireless authentication request (YES in step S2408), performs the authentication sequence process M3004 together with the wireless terminal 2501, and subsequently starts an association process M3005 in step S2409.

Upon completion of the authentication sequence process M3004, the association process M3005 between the wireless terminals 2901 and 2902 is performed. Upon completion of the association process M3005 (YES in step S2410), the state of the wireless terminal 2901 and the wireless terminal A 2902 is changed to an in-communication state.

When the wireless terminal B 2903 receives the probe request message M3002 from the wireless terminal 2901 in step S2401, the process proceeds to step S2402. In step S2402, the wireless terminal B 2903 decodes the group identifier (SSID) 2215 and the length 2214 by using a shared key.

Then, the wireless terminal B 2903 determines in step S2403 whether the decoded group identifier (SSID) 2215 is a probe request message indicating a proper registration request. That is, the wireless terminal B 2903 determines whether the decoded group identifier (SSID) 2215 is a special character string (for example, "REGREQ"), which is stored in the storage area unit 205 and which means a registration request, whether the terminal identification information of the wireless terminal 2901 is not matched with the MAC address stored in the management frame 2201, and whether the associated four digits are not matched with the last four digits of the manufacturer's serial number of the wireless terminal B 2903. If it is not confirmed that the decoded group identifier (SSID) 2215 is the special character string (NO in step S2403), the wireless terminal B 2903 refers to the terminal access information table stored in the storage area unit 205 according to the terminal identification information (the MAC address or the like) 2801 of the wireless terminal 2901. Similarly, if there is the possibility of spoofing due to the wrong terminal identification information, or if the associated four digits are not matched with the last four digits of the manufacturer's serial number of the wireless terminal B 2903, the wireless terminal B 2903 refers to the terminal access information table stored in the storage area unit 205 according to the terminal identification information 2801 of the wireless terminal 2901. Then, the wireless terminal B 2903 updates the number of times of accesses 2802. Also, the wireless terminal B 2903 sets data representing "NG" in the connection check 2803. Further, the wireless terminal B 2903 transmits a probe response message M3006, in which the field of the length 2214 included in the SSID information element 2210 of the SSID 2216 represents "0" and in which the group identifier is unset in the SSID region 2215, in a unicast form to the wireless terminal 2901 in step S2407.

When receiving the probe response message M3006, the wireless terminal 2901 checks the group identifier (SSID) 2215. If the group identifier is absent, the wireless terminal 2901 performs the list display of the group identifier (SSID) 2215. In this case, the group identifier represented by the group identification information 2215 is unset. Thus, as shown in FIG. 30, the list display of "??????" is performed.

Then, the wireless terminal B 2903 checks the number of times of accesses 2802 from the wireless terminal 2901 in step S2405. In a case where the number of times of accesses 2802 does not exceed a predetermined number of times (for example, 16), the state of the wireless terminal B 2903 is changed to a state in which the wireless terminal B 2903 is ready for receiving a probe request message from a wireless terminal. Conversely, if the number of times of accesses 2802 exceeds the predetermined number of times, the wireless terminal B 2903 refers to the terminal access information table stored in the storage area unit 205. Then, the terminal identification information (the MAC address or the like) 2801 of the wireless terminal B 2903 is registered in a MAC address filter. Subsequently, the wireless terminal B 2903 performs the terminal access control process using the MAC address in step S2406.

It is further noted that a probe request message and/or a probe response message may be encrypted by using a public key and may be decoded by using a secret key, and vice versa.

In step S2402 shown in FIG. 24, a probe response message, in which the data length 2214 included in the SSID information element frame 2210 of the SSID 2216 represents "0" and in which the group identifier is unset in the SSID region 2215, is transmitted in a unicast form. However, no probe response message can be transmitted in step S2404. In this case, a wireless terminal having transmitted a probe request message receives no probe response message. Consequently, the wireless terminal displays only devices, which transmit probe response messages, as a connectable AP or a connectable wireless terminal.

When a wireless terminal receives a probe response message representing a data frame in which the data length 2214 represents "0" and in which the group identifier (SSID) information 2215 is unset, the wireless terminal may display no originating device that transmits the probe response message.

Determination in step S2403 shown in FIG. 24 may be performed according to other kinds of information. For example, whether a connection request is appropriate may be determined according to whether a group identifier (SSID) is matched with the group identifier (SSID) in operation. Practically, in a case where the AP 103 shown in FIG. 21 receives a probe request message, if the group identifier included in this message is "ABC123", it is determined that this message is a proper connection request. If one of other group identifiers is included in this message, it is determined that this message is not a proper connection request.

Other Exemplary Embodiments, Features and Aspects of the Present Invention

Although an IEEE 802.11-based wireless LAN system has been described in the description of each of the embodiments, the present invention can be implemented in another wireless type network. Alternatively, the present invention can be implemented in a wired network. Additionally, various modifications may be made without departing from the scope of the invention.

As described above, the step of preliminarily notifying a user, who operates a wireless terminal, of the group identifier (SSID) is omitted to thereby solve the problem of leakage of information. Thus, the security can be enhanced.

Also, the necessity for once canceling the stealth function by the administrator of the access point is eliminated. Thus, the connectable wireless terminal can appropriately select a desired access point from a list of access points, the connection to which is permitted thereto (or access points that send back a response). Also, the need for the administrator and the users of the wireless terminals to perform troublesome operations is eliminated to thereby enhance the convenience of the system.

Even in a case where different wireless terminals are adjacent to each other and simultaneously performs setting of connection, a connection request from a desired wireless terminal can be discriminated. Thus, the frequency of occurrence of an improper connection can be alleviated.

Also, leakage of information concerning the group identifier, temporary turning-off of a stealth function at the connection/acceptance of a wireless terminal, and tentative operation halt due to transition to a special state, such as a registration mode, can be prevented. Also, flexible control of connection to applicants for access can be realized.

As is apparent from the foregoing description, the present invention has an advantage in that both of easy-access to the wireless communication system (that is, reduction in the users' effort of performing the connection to the network) and realization of high-level security can be satisfied.

The present invention may be applied to either a system constituted by a plurality of units (for example, a host computer, an interface device, a reader, a printer, and the like), or to an apparatus consisting of a single unit (for instance, a copying machine, a facsimile apparatus, or the like).

The features of the present invention can be achieved by providing a recording medium, on which software program code enabled to implement the functions of the aforementioned embodiments is recorded, to a system or an apparatus, whose computer (or a CPU or an MPU) reads and executes the program code stored in the recording medium.

In this case, the program code itself read from the recording medium implements the functions of the aforementioned embodiments. Thus, the program code itself and the recording medium, which stores the program code, constitute the present invention.

For example, a floppy disk ("floppy" is a registered trademark), a hard disk, an optical disk, a magneto-optical disk, a CD-ROM, a CD-R, a magnetic tape, a nonvolatile memory card, and a ROM may be employed as the recording medium for supplying the program code.

The functions of the aforementioned embodiments are implemented not only by executing the read program code in the computer but by performing part or all of actual processing according to instructions, which are issued by the program code, by an OS (Operating System) running on the computer.

The functions of the aforementioned embodiments are also implemented by performing part or all of the actual processing by a CPU or the like, which is provided in a function expansion board inserted into the computer or in a function expansion unit connected to the computer, according to instructions issued by the program code that is read from the storage medium after written to a memory provided on the function expansion board or on the function expansion unit.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Applications No. 2005-027224 filed Feb. 3, 2005, No. 2005-043142 filed Feb. 18, 2005, and No. 2005-342224 filed Nov. 28, 2005, which are hereby incorporated by reference herein in their entirety.

What is claimed is:

1. A communication apparatus configured to transmit a notification signal and a response signal in response to a search signal transmitted from an another additional communication apparatus, wherein the notification signal and the response signal include information regarding a network, the communication apparatus comprising:
 a switching unit configured to switch on and off a hiding function to transmit the notification signal without including group identification information in the notification signal;
 a receiving unit configured to receive a search signal from the additional communication apparatus when the switching unit switches on the hiding function;
 a determination unit configured to, based on information included in the search signal received by the receiving unit, determine whether to notify the additional communication apparatus of the group identification information; and
 a notifying unit configured to include the group identification information in the response signal in response to the search signal and transmit the response signal so as to notify the additional communication apparatus of the group identification information according to determination performed by the determination device.

2. The communication apparatus according to claim 1, wherein the determination unit is configured to, based on the information included in the search signal, determine whether the additional communication apparatus is already registered as a connection permittee apparatus.

3. The communication apparatus according to claim 2, further comprising a transmitting unit configured to, when it is determined by the determination unit that the additional communication apparatus is not already registered, transmit the response signal without including the group identification information in the response signal.

4. The communication apparatus according to claim 2, wherein the determination unit is configured to, based on identification information of the additional communication apparatus included in the search signal and on registered terminal information stored in the communication apparatus, determine whether the additional communication apparatus is already registered.

5. The communication apparatus according to claim 2, wherein the determination unit is configured to, based on identification information of the additional communication apparatus included in the search signal and on registered terminal information stored in an additional network apparatus connected to the communication apparatus, determine whether the additional communication apparatus is already registered.

6. The communication apparatus according to claim 2, wherein, if the determination unit determines that the additional communication apparatus is not already registered, the notifying device does not respond to the search signal.

7. The communication apparatus according to claim 2, wherein the determination unit is configured to, according to whether predetermined information is included in a first group identification information included in the search signal, determine whether to notify the additional communication apparatus of the group identification information.

8. The communication apparatus according to claim 7, wherein the notifying unit is configured to include the group identification information in the response signal and transmit the response signal so as to notify the additional communication apparatus of the group identification information according to determination performed by the determination unit.

9. The communication apparatus according to claim 7, wherein the predetermined information is at least one of information for requesting registration from the additional communication apparatus to the communication apparatus, information based on identification information of the additional communication apparatus, and information based on identification information of the communication apparatus.

10. The communication apparatus according to claim 7, wherein the predetermined information is used to identify a network constructed by the communication apparatus.

11. The communication apparatus according to claim 7, further comprising,
 a storage unit configured to store a number of times that the determination unit has determined that the predetermined information is not included in the search signal from the additional communication apparatus; and
 a limiting unit configured to limit access from the additional communication apparatus according to the number of times.

12. A communication system comprising:
a first communication apparatus for transmitting a notification signal and a response signal in response to a search signal transmitted from another additional communication apparatus; and
a second communication apparatus for transmitting the search signal, wherein the notification signal and the response signal includes information regarding a network,
wherein the first communication apparatus includes,
a switching unit configured to switch on and off a hiding function to transmit the notification signal without including group identification information in the notification signal;
a determination unit configured to, based on information included in a search signal received from the second communication apparatus when the switching unit switches on the hiding function, determine whether to notify the second communication apparatus of the group identification information; and
a notifying unit configured to include the group identification information in the response signal in response to the search signal and transmit the response signal so as to notify the second communication apparatus of the group identification information according to the determination performed by the determination unit; and
wherein the second communication apparatus includes,
a transmitting unit configured to transmit the search signal; and
a selecting unit configured to, when the group identification information is included in a response signal in response to the search signal from the first communication apparatus, select desired group identification information.

13. A communication method for transmitting a notification signal and a response signal from a communication apparatus, in response to a search signal transmitted from another additional communication apparatus, wherein the notification signal and the response signal include information regarding a network, the method comprising:
switching on and off a hiding function to transmit the notification signal without including group identification information in the notification signal;
receiving a search signal from the additional communication apparatus when the switching switches on the hiding function;
determining, based on information included in a received search signal, whether to notify the additional communication apparatus of the group identification information; and
including the group identification information in the response signal in response to the search signal and transmitting the response signal so as to notify the additional communication apparatus of the group identification information according to a determination made in the determining step.

14. A communication method between a first and second communication apparatus, the first communication apparatus configured to transmit a notification signal and a response signal in response to a search signal transmitted from another additional communication apparatus; and a second communication apparatus configured to transmit the search signal, wherein the notification signal and the response signal includes information regarding a network, the method comprising:
the first communication apparatus performing,
switching on and off a hiding function to transmit the notification signal without including group identification information in the notification signal;
determining, based on information included in a search signal received from the second communication apparatus when the switching switches on the hiding function, whether to notify the second communication apparatus of the group identification information; and
including the group identification information in the response signal in response to the search signal and transmitting the response signal so as to notify the second communication apparatus of the group identification information according to the a determination performed in the determining step; and
the second communication apparatus performing,
transmitting the search signal; and
selecting, when the group identification information is included in a response signal in response to the search signal from the first communication apparatus, desired group identification information.

15. A computer readable storage medium containing computer-executable instructions that control a communications system which includes a first communication apparatus configured to transmit a notification signal and a response signal in response to a search signal transmitted from another additional communication apparatus, and a second communication apparatus configured to transmit the search signal, wherein the notification signal and the response signal includes information regarding a network, the computer readable storage medium comprising:
computer-executable instructions that transmit a predetermined message from the second communication apparatus to the first communication apparatus when the first communication apparatus hides group identification information;
computer-executable instructions that cause the first communication apparatus to, based on information included in the predetermined message, determine whether to notify the second communication apparatus of the group identification information;
computer-executable instructions that cause the first communication apparatus to transmit a response signal including the group identification signal to the second communication apparatus according to determination performed; and
computer-executable instructions that cause the second communication apparatus to determine whether the group identification information is included in the response signal and to display the group identification information.

* * * * *